United States Patent [19]  [11] Patent Number: 5,585,691
Washburn  [45] Date of Patent: Dec. 17, 1996

[54] ELECTRON BEAM GENERATION AND CONTROL FOR DYNAMIC COLOR SEPARATION

[76] Inventor: Clayton A. Washburn, 24 Andrea La., Thornwood, N.Y. 10594

[21] Appl. No.: 396,769

[22] Filed: Mar. 1, 1995

Related U.S. Application Data

[62] Division of Ser. No. 162,635, Dec. 3, 1993, Pat. No. 5,399,947, which is a division of Ser. No. 863,380, Feb. 18, 1992, Pat. No. 5,291,102, which is a continuation-in-part of Ser. No. 596,353, Oct. 12, 1990, abandoned.

[51] Int. Cl.$^6$ .............. H01J 19/38; H01J 21/18
[52] U.S. Cl. .............. 313/452; 313/453; 313/411
[58] Field of Search .............. 313/442, 453, 313/452, 411, 412

[56] References Cited

U.S. PATENT DOCUMENTS

| | | | |
|---|---|---|---|
| 3,096,095 | 7/1963 | Churchill | 274/10 |
| 3,096,395 | 7/1963 | Gargini | 348/814 |
| 3,312,779 | 4/1967 | Washburn | 178/5.4 |
| 3,431,456 | 3/1969 | Liebscher | 315/13 |
| 3,595,990 | 7/1971 | Washburn | 178/5.4 |
| 3,798,478 | 3/1974 | Say | 313/411 |
| 3,914,651 | 10/1975 | Washburn | 315/371 |
| 4,333,105 | 6/1982 | Kaku et al. | 358/67 |
| 4,626,900 | 12/1986 | Inoue et al. | 358/67 |
| 4,635,105 | 1/1987 | Favreay | 358/67 |
| 4,881,016 | 11/1989 | Margolis | 315/376 |
| 4,899,079 | 2/1990 | Van Gorkum et al. | 313/412 |
| 5,039,923 | 8/1991 | Ogino et al. | 313/442 |
| 5,291,102 | 3/1994 | Washburn | 315/383 |

Primary Examiner—Brian Zimmerman
Assistant Examiner—Michael Day
Attorney, Agent, or Firm—Nolte, Nolte & Hunter, P.C.

[57] ABSTRACT

A dynamic color separation display CRT having an electron beam forming structure for beam generation and electrostatic impingement control. The electron gun forms a group of electron beams and includes a multi-aperture G1 grid for receiving the electron beam group. The group of electron beams overlap and combine to provide an impingement pattern that matches a primary color stripe without use of a shadow mask when focused on the output screen surface. An alternate preferred embodiment includes a grooved cathode to control the size, shape, and profile of the emitted beam.

9 Claims, 15 Drawing Sheets

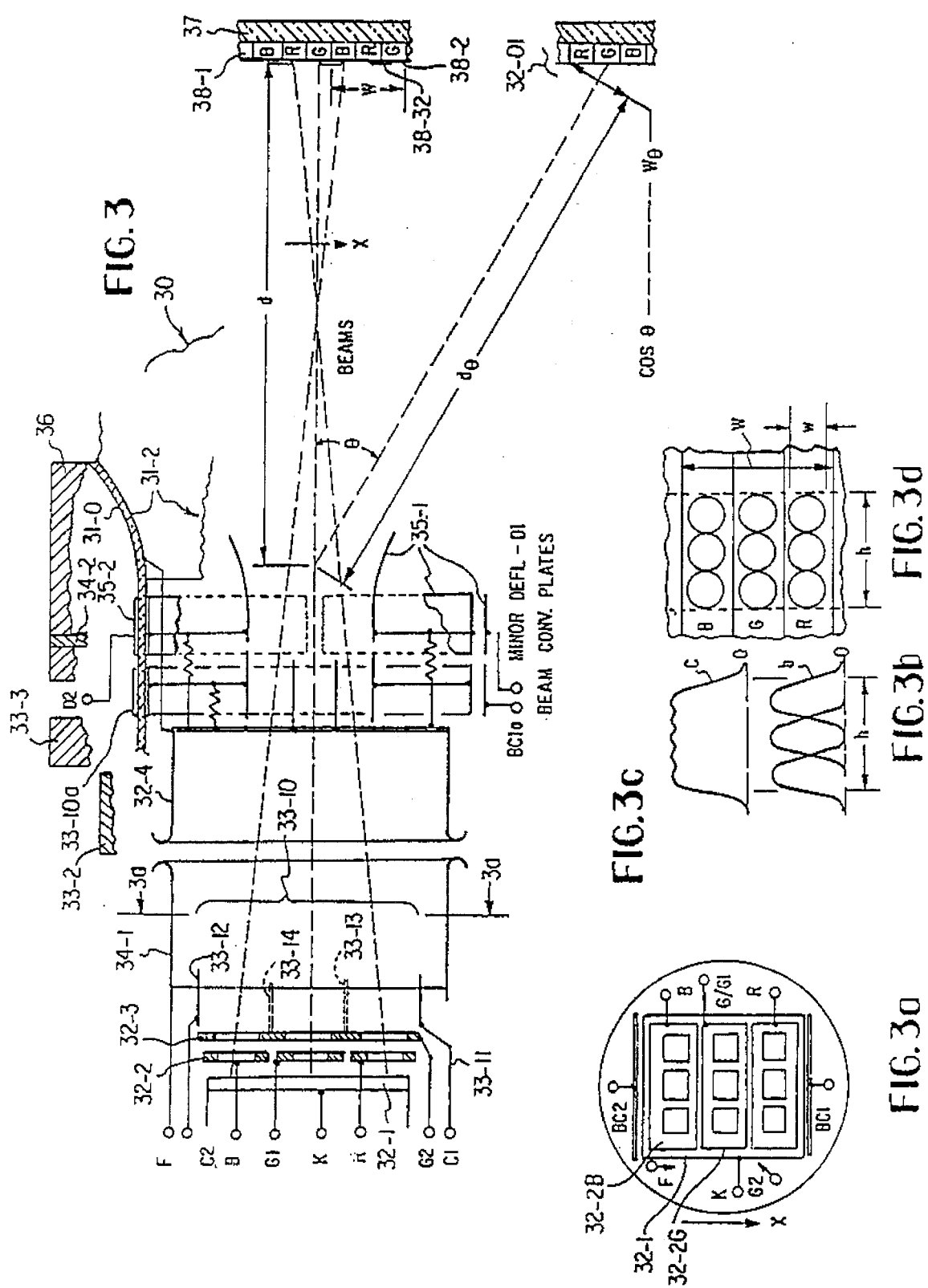

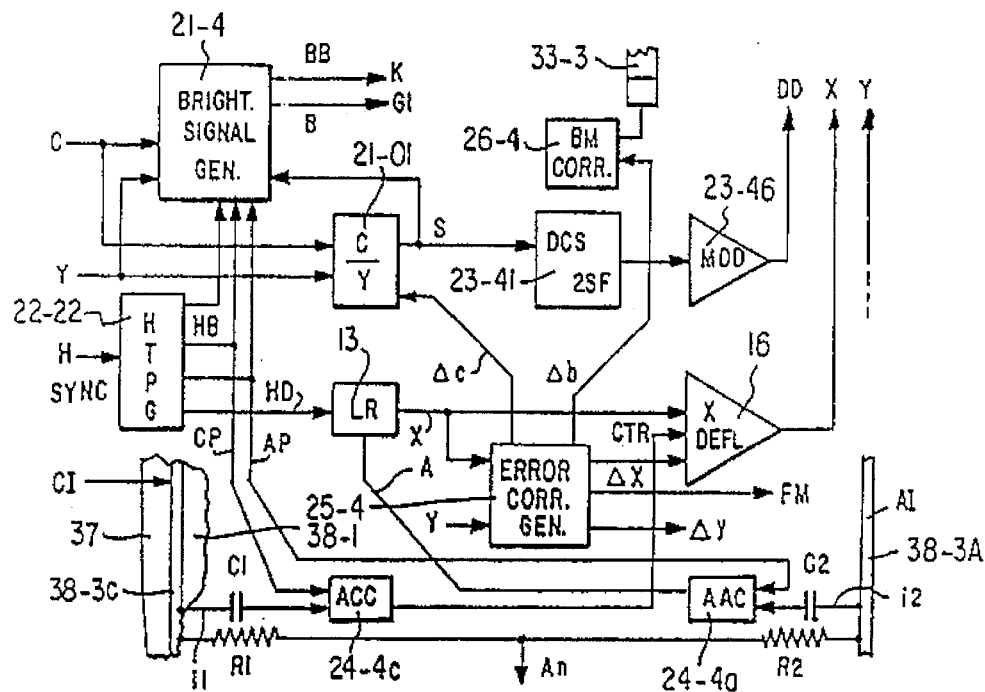
FIG. 4
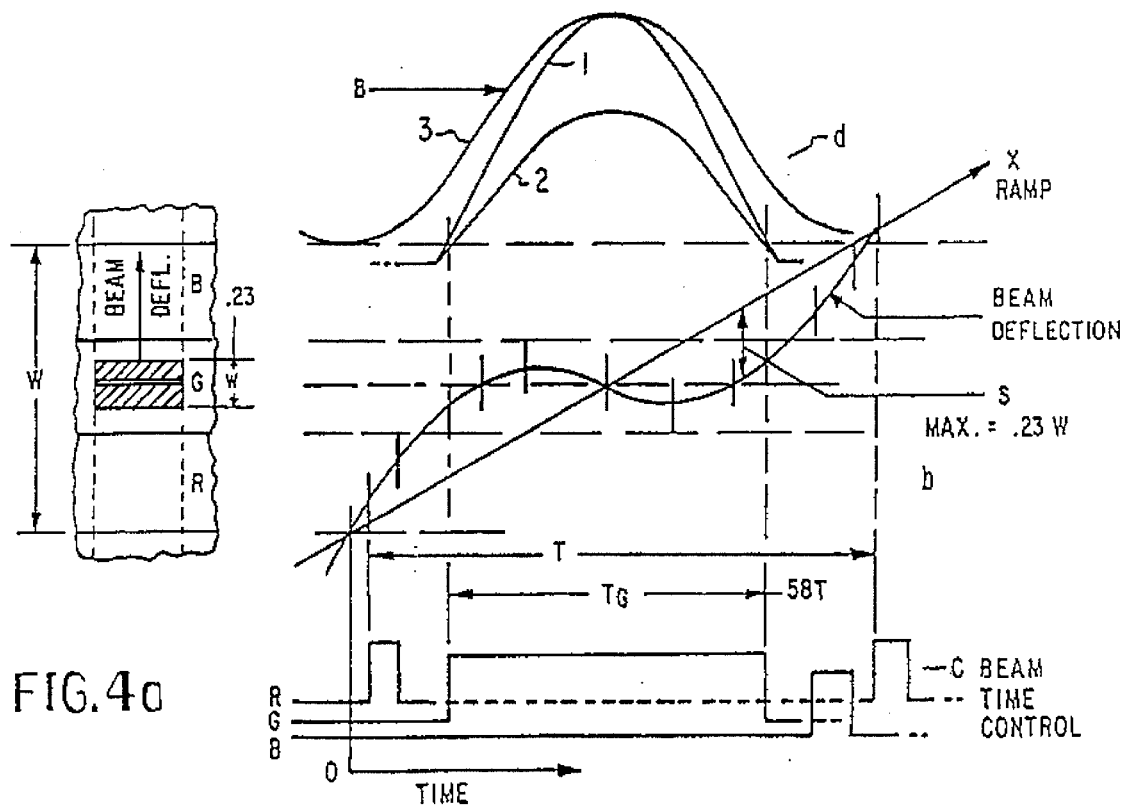
FIG. 4a
FIG. 4b

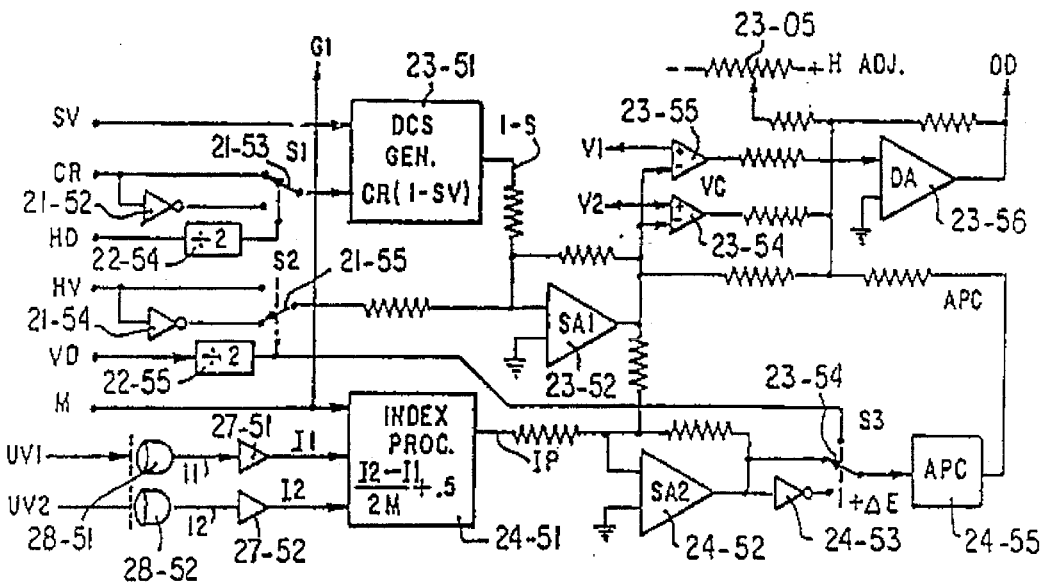
FIG. 5
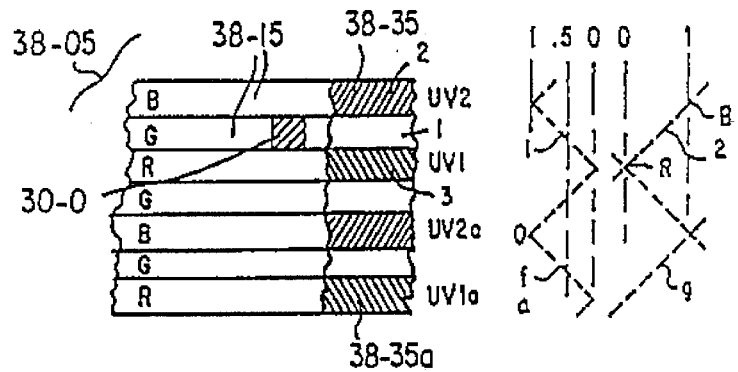
FIG. 5a
FIG. 5c
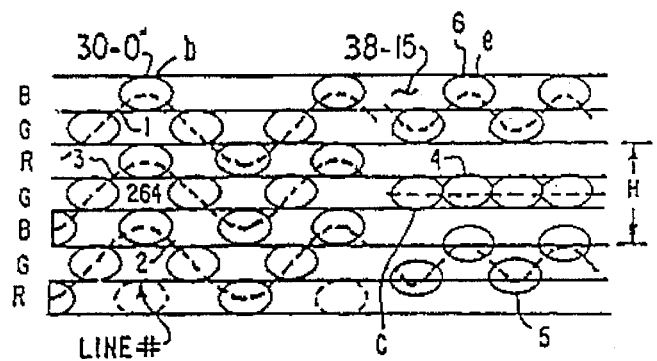
FIG. 5b

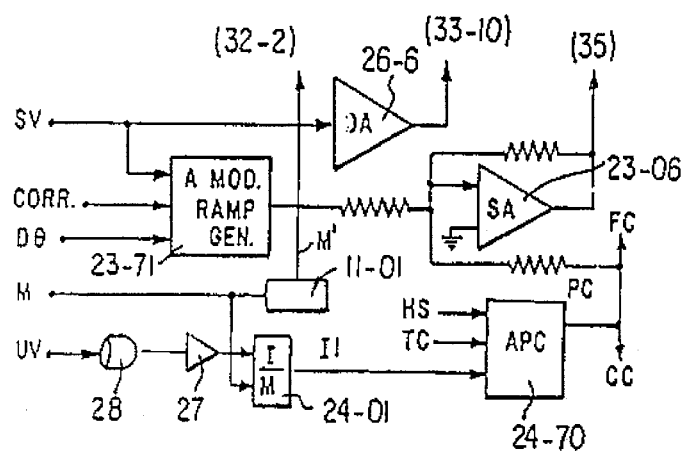
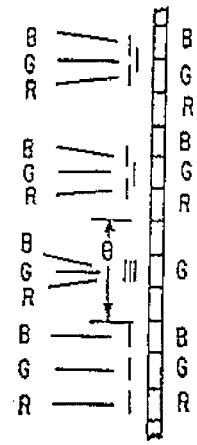
FIG. 7
FIG. 7c
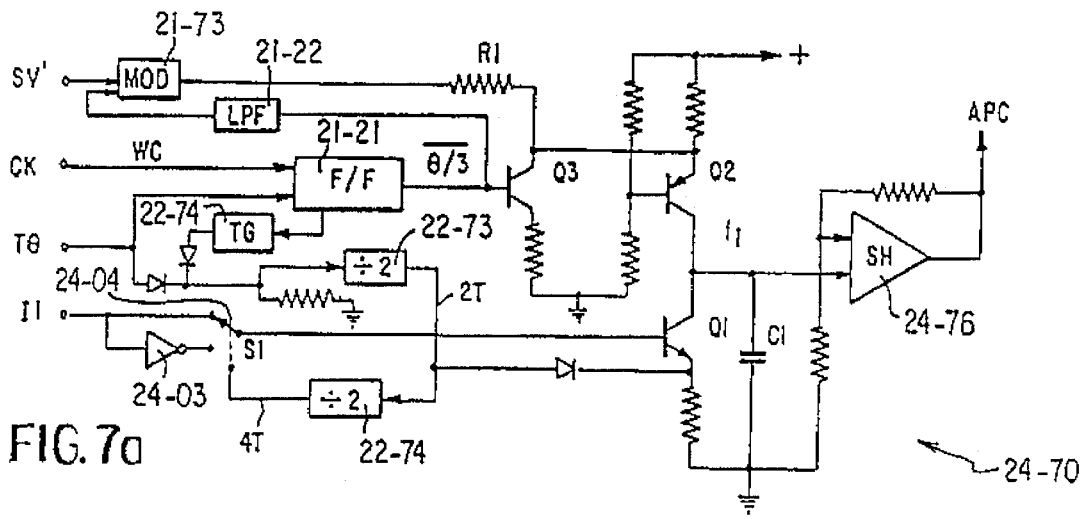
FIG. 7a
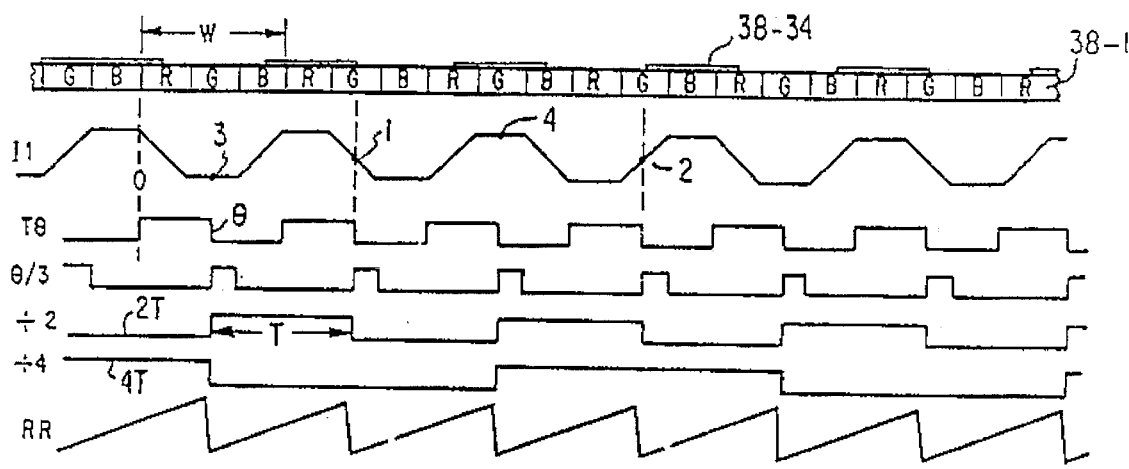
FIG. 7b

FIG. 8
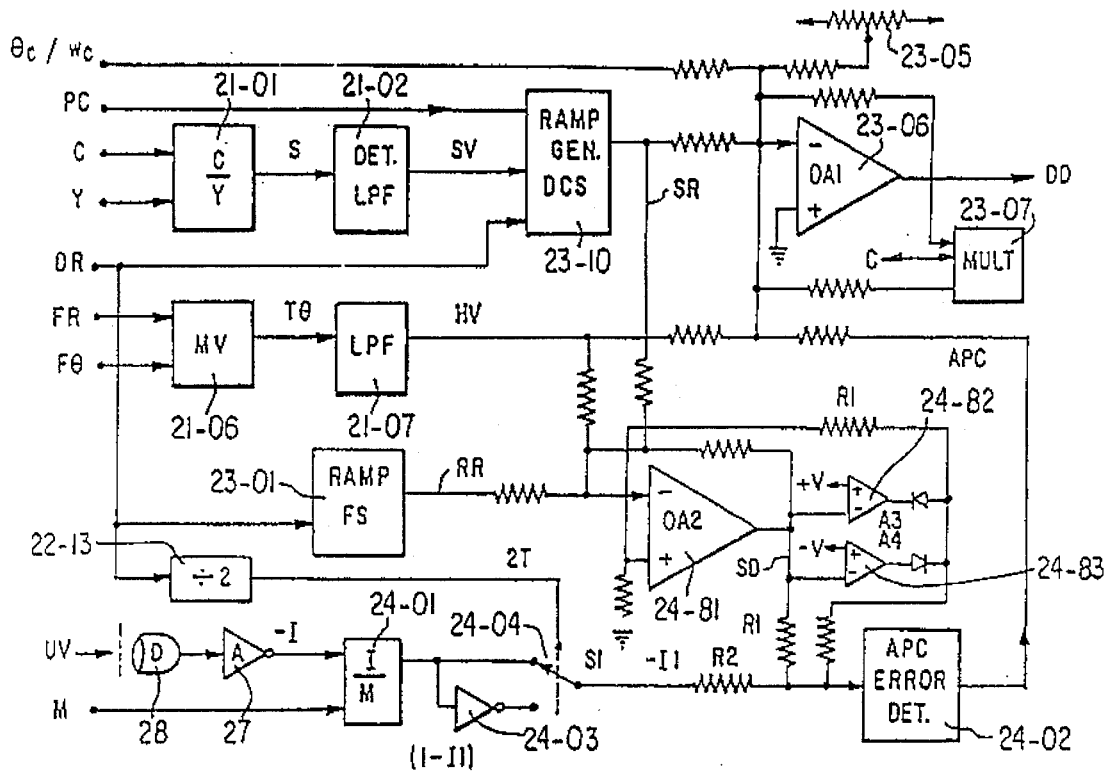
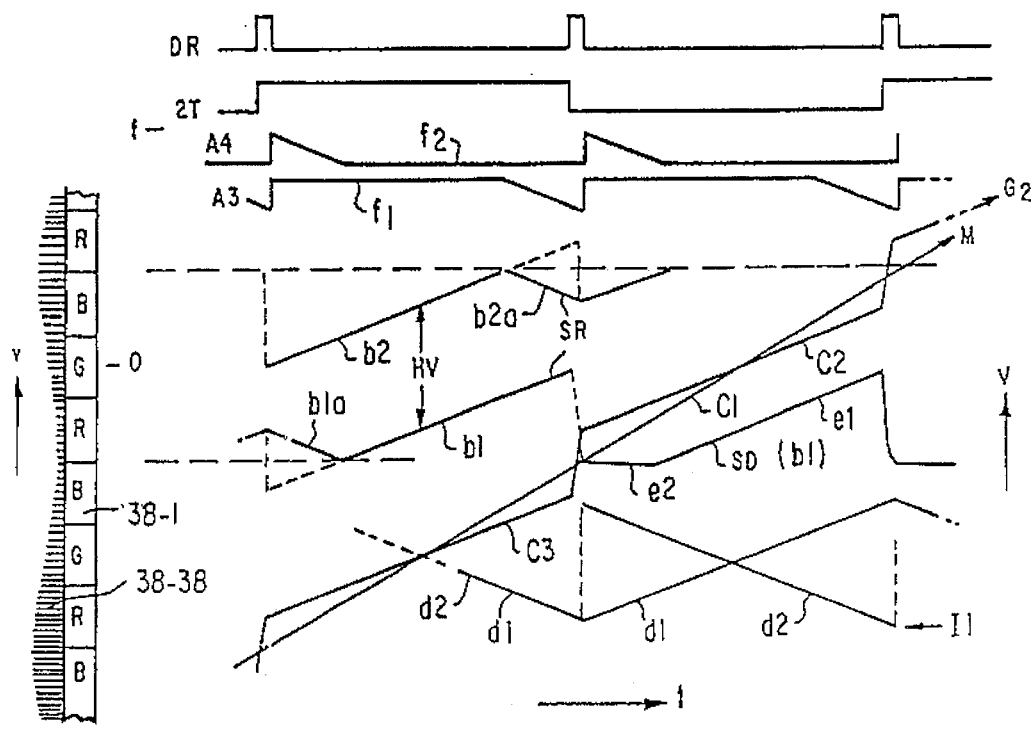
FIG. 8a  FIG. 8b

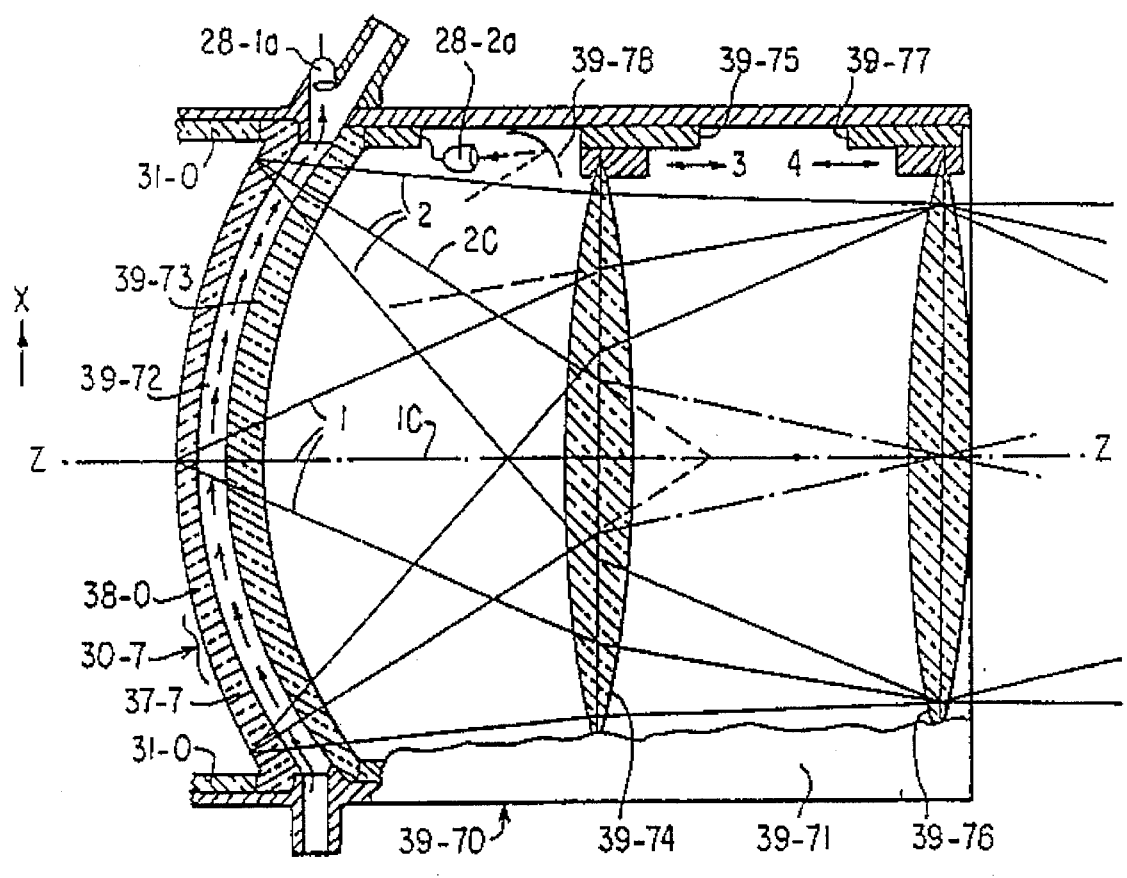
FIG. 10
FIG. 11a
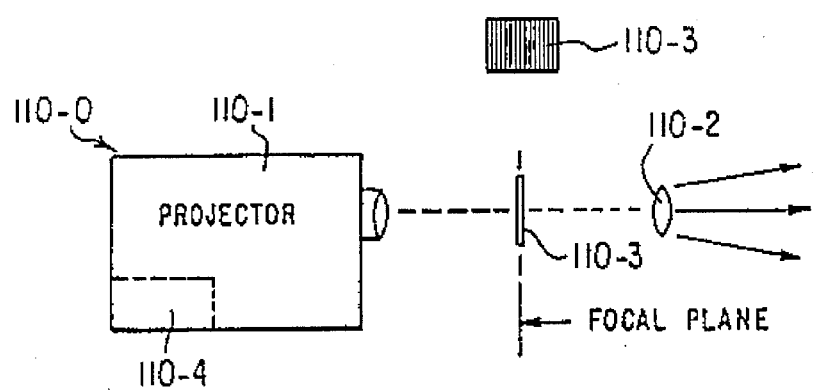
FIG. 11

ELECTRON BEAM GENERATION AND CONTROL FOR DYNAMIC COLOR SEPARATION

CROSS REFERENCE TO RELATED APPLICATION

This application is a division of application Ser. No. 08/162,635, filed Dec. 3, 1993, now U.S. Pat. No. 5,399,947, which is a division of application Ser. No. 07/863,380, filed Feb. 18, 1992, now U.S. Pat. No. 5,291,102, which was a continuation-in-part of U.S. application Ser. No. 07/596,353, which was filed on Oct. 12, 1990, now abandoned.

TECHNICAL FIELD

This invention relates to the electrically controlled generation or reproduction of color displays based on a composite video input signal providing information as to the timing or synchronization, the luminance or brightness content, and the chrominance or color content of the display output. The technique employed is that of dynamic color separation wherein an energy beam is directed in a repeated and prescribed sequence over the format of the display screen area only to those colors required to be produced, thereby providing a high efficiency display.

BACKGROUND

This invention will be described in relation to the video content of the NTSC TV signal. However, NTSC transmission includes gamma (γ) correction for typical CRT beam drive non-linearity. This feature is not pertinent to some color separation methods and it is to be understood that gamma correction will not apply herein except where shown. NTSC is well known and there are numerous methods by which the signal may be separated into three fundamental components of timing (sync), luminance (Y) and chrominance (C). The NTSC signal may be further converted into the display outputs components which are equal brightness, the means by which the eye sees the intensity output of the display, and into its dominant hue (H) and degree of saturation (S), which are the two components by which the eye recognizes color content (its chromaticity) of a scene. The method of generation of the display, however, relies on the provision of three primary colors, red (R), green (G) and blue (B), which have become the universal standard for providing a full range of color content.

Several methods of color display are known in the art. These include the well known shadow mask and CRT's employing beam penetration phosphors. A third system uses a separate CRT for generation of each color and the three components must be mechanically and optically superimposed exactly to register the three outputs to provide a single full color display. These methods each have distinct disadvantages with respect to parameters such as bulk, complexity, and cost and performance characteristics such as luminous output efficiency, resolution, and display accuracy.

Another type of system, most of which were unsuccessful and eventually abandoned, are known as indexing systems. These systems failed, generally, because of technical requirements, the importance of which were not recognized, or because the art was not sufficiently advanced to meet the systems' needs.

A large majority of these indexing systems rely on a technique known as sequential color separation (SCS). SCS depends upon the scan of an electron beam in a cathode ray tube across a sequential pattern of triads of primary color phosphors (e.g., red, green and blue). The control signals for each of these colors turn on the beam in the proper sequence for each phosphor position, and this must be very precisely controlled to provide faithful color rendition. The function of indexing is to provide this precise beam position control which, in uniform raster scan applications, implies precise time control.

Because SCS implies a single beam which passes sequentially across all colors, even if a particular color is not to be produced, this technique has a fundamental limitation in beam energy efficiency of 17%. This efficiency is comparable to that of the shadow mask techniques and prevented "indexing" from achieving the advantages over other methods which were expected of it. Attempts to use beam velocity modulation to improve efficiency were not compatible with other requirements specifically including the methods for indexing then used. As a result, these SCS systems failed to become competitive.

Other proposed displays departed from SCS but never achieved the reality of production. These had in common the concept of dynamically directing the beam (necessarily at high speeds for TV) only to the colors to be reproduced in each color triad. This concept has the possibility of a beam efficiency reaching 100% and in addition permits use of more than one beam, both thereby providing means to generate a very bright, high resolution output. This concept has basic features distinctly different from SCS, and the term "dynamic color separation" (DCS) is introduced herein to describe this mode of color separation.

The art of indexing-type color receivers has been substantially dormant for many years except for a minor recent revival of interest in small displays using SCS. During this interval, a substantial variety of improvements has been made in fields unrelated to SCS or DCS displays. A substantial number of improvements, related to the B/W functions of the display or to improved signal control means such as solid state and IC circuits, which are desirable to obtain the performance required to make a DCS display successful, have had no suggestion of applicability in this field.

With respect to the color display functions, a principal DCS signal processing function is conversion from input composite video (CV) to luminance Y, and R, G, and B signals, or to equal brightness monochrome M and saturation S signals, and further from S to hue phase (1) or derived voltage (HV) and saturation voltage (SV) control signals. The first is well known in the art, and the second (M and S) is not so well known but was first derived by B. D. Loughlin, and a detailed description relating them directly to DCS may be found in U.S. Pat. No. 3,312,779 (Washburn).

Prior art employing waveforms providing features essential to DCS in a color display are to be found in U.S. Pat. No. 2,989,582, (Zworykin et al) which describes excessively complicated ramp waveforms; U.S. Pat. Nos. 2,966,544, 3,004,098 and 3,096,095 (Gargini) which disclose a saturation signal amplitude modulated ramp waveform for DCS; U.S. Pat. No. 3,312,779 (Washburn) which employs both the amplitude modulated ramp and a saturation signal time modulated, dual slope beam arrest ramp for DCS; and U.S. Pat. No. 3,431,456 (Liebscher) which describes a three beam system employing a fixed amplitude beam arrest ramp for DCS. U.S. Pat. No. 3,914,651 (Washburn) divided from above U.S. Pat. No. 3,312,779 also describes electron gun structures suitable for DCS application and compatible with improvements herein.

There are a substantial number of prior art systems which use the chrominance component C of composite video to velocity modulate the beam, thereby to provide a degree of color brightness enhancement. Because C is a function of signal luminance Y, it can not perform color separation which is a function only of display format dimensions and scan timing and which must be independent of display luminance or brightness content. The saturation signal S, which is independent of luminance can provide color separation control independently of luminance Y or monochrome M content of the display. Basic color separation using C, of which U.S. Pat. No. 3,983,165 (Sunstein) is a relatively recent example is, however, still SCS.

There are prior systems which use miscellaneous fixed waveforms for deflection of the electron beam across horizontally oriented stripes, which is also SCS. There is no prior art teaching employing DCS for either of these two examples.

The above DCS techniques all employ frequency or time control to control the position of the beam. Thus, Sworykin uses an index pulse as a direct sync signal (sequentially) at each triad. Gargini develops a heterodyned, or beat frequency, signal (as do many SCS systems) controlled by the index signal system. This method of time/position control, which has been a preferred choice for SCS, conflicts with the modulation of the beam velocity and even more directly with DCS because hue position selection demands selective movement of the beam across the color triad of each pixel. This movement is controlled by the phase shift of chrominance C, or S (independent of luminance), whereas the index signal should generate a reference signal having constant phase. There is no prior art teaching which eliminates this problem.

Sunstein's purpose (as is Gargini's) is to ameliorate this problem, and reference is made to Columns 2 and 3 of the above Sunstein patent for a background discussion of the problems of such prior art. Leibscher also describes his three beam system using an index generated frequency control signal. It is readily apparent that when the DCS beam arrest is working satisfactorily, both the amplitude and frequency content of the index signal disappear in this disclosed system. In Washburn, time shifts sequentially between DCS action and position control (APC) action, thereby making the functions perform independently. This method introduces circuit complexity but has the more significant disadvantage that it introduces low frequency dead space into the display. The eye is more sensitive to this low frequency content than to otherwise normal pixel structure. Thus, prior art discloses no position control means which are well suited to work with DCS.

In summary, there had been much initial interest in SCS indexing color TV receivers because they appeared to be simpler and to provide higher performance—especially a higher resolution display. SCS, however, proved to have low light output efficiency, and methods to increase light output also increased complexity and cost. The very factors which allow increased resolution also add to the difficulties of achieving high brightness and require high precision in control of the beam to provide output color fidelity. Some basic concepts, especially dynamic color separation (DCS) waveforms which increase brightness efficiency, were introduced. These methods, however, all had deficiencies in generating a satisfactory display which were never recognized or overcome because attempts to develop "indexing systems" were abandoned. This has remained the situation for the past twenty years. During this interval demand for higher performance, resolution, size, brightness, etc. have increased, and economical solutions have not appeared. Recent introduction of various aspects of HDTB is one example of such recent demand.

SUMMARY OF THE INVENTION

In accordance with the invention, a DCS display system includes a timing circuit which produces a set of unique signals for correcting errors produced when hue is controlled by the phase of the (S) signal and the degree of saturation with its amplitude. In a basic DCS system, the electron beam in a CRT is controlled to impinge on red, green or blue phosphors in prescribed amounts to generate a desired color. It should be noted at this point that the color producing beam or beams may be any of several types of beams, an electron beam being only one example. Another example is a laser beam. Similarly, the phosphors may be replaced by other elements which respond to the beam to produce the primary colors.

This invention discloses a number of embodiments which generate dynamic color separation waveforms used to control one or more directed energy beams to provide improved color displays. The embodiments describe simple low cost displays, very high performance "direct view" displays, and large, bright high performance electro-optical projection displays. They describe a number of unique DCS system arrangements for accomplishing these purposes. And they describe the ancillary items and functioning elements essential to provide workable examples of each embodiment.

The invention teaches that a very high degree of precision in beam control is required to provide adequate color fidelity and that prior disclosed systems have errors and/or control deficiencies which preclude an acceptable color display. Accordingly, a number of beam control features and circuit function elements are introduced, each being selected for compatibility with the objectives of the particular embodiment.

A principle ancillary function of the invention is beam position control (APC) by means of an "index" generated signal. Unique APC circuits and indexing patterns are described, each suitable to operation with specific DCS embodiments.

A second function is display format area error correction control. Position error is inherent in beam deflection over the format, and correction methods are provided. There are also beam distortion errors. Unique multi-beam forming arrangements are introduced to provide a beam pattern to match the basic color pattern of each pixel. They achieve substantial brightness increase. In these arrangements beam distortion becomes critical and appropriate correction methods are provided.

A third correction area involves the color separation. There are discrepancies between the input signal and the behavior of specific DCS waveforms. The beam parameters—especially beam width—also introduce color separation errors. Each embodiment provides means for elimination of the errors inherent in its arrangement.

The invention introduces a number of control and timing sequence waveforms to accomplish the above purposes. It is shown that DCS involves a substantial number of timing relationships not pertinent to conventional displays whose instability can be a further source of error. Time locked synchronizing circuits are described which eliminate this potential error source.

As described in U.S. Pat. No. 3,312,779, the beam scan is arrested at each pixel as it passes a phosphor of a color whose intensity is to be increased, and the beam is allowed to traverse quickly a color phosphor whose intensity is to be low. The amplitude and/or time dwell of the scan which determines the degree of saturation is controlled by the amplitude of the saturation signal S, and the phase of S determines the dominant hue of the display's output.

This system suffers from the problem that the reproduction of a hue and its degree of saturation between 100% saturation (a pure primary color) and white (equal amounts of all primary colors) involves non-linear relationships in the position and the amount of beam arrest in reference to each pixel. The relationship is further complicated by the fact that it is a function of the width and distribution of the electron beam. In other words, the voltages which must be applied to the scanning beam of a DCS display to direct it to the proper phosphors to produce a desired degree of saturation of a particular hue are not generally linearly related to the phase or amplitude of the chrominance information content of the video signal.

Applicant has discovered, however, that the relationship can be determined for a beam of any usable width and that the DCS errors repeat at three times the rate at which the triads (a set of red, green and blue phosphors) are scanned. Accordingly, the errors can be corrected if time and/or voltage corrections are applied in accordance with the desired hue and degree of saturation.

In accordance with one aspect of the invention, a circuit produces a series of waveforms which are multiples of the triad scan rate or to waveform processing circuits which convey the same proportionality relationships. These waveforms are used to apply corrections to the beam arrest voltages of a DCS system as a function of the degree of saturation and the hue.

Finally, CRT assembly beam control features are provided which enable the color separation and error control functions of each embodiment described.

BRIEF DESCRIPTION OF THE DRAWINGS

FIG. 3 is a detailed longitudinal cross section of a CRT.

FIG. 3a is a cross section of the grid structure and a common cathode taken along the line 3a—3a of FIG. 3.

FIG. 3b is a graph of a beam distribution of single apertures.

FIG. 3c is a graph of a combined distribution of the effective beam groups in its elongated direction formed by multiple apertures.

FIG. 3d is a view showing the relation between the beam pattern and a pixel.

FIG. 4 is a schematic circuit diagram of a relatively simple dynamic color separation display.

FIG. 4a is a schematic of a beam scanning a color triad.

FIG. 4b is a graph illustrating dynamic color separation using the S signal for sine wave velocity modulated beam arrest, index APC control of the line scans centering position and amplitude, and a distortion correction generator for correcting the beam position during its scan across color triads.

FIG. 5 is a circuit diagram of a one gun, horizontal stripe dynamic color separator using the saturation signal S.

FIGS. 5a–5c show the scanning motion of the color separator of FIG. 5 for a phosphor sequence of RGBGRG.

FIG. 7 is a circuit diagram providing novel dynamic color separation and APC for a three beam CRT display.

FIG. 7a is a time pulse controlled circuit for providing APC signals for the embodiment of FIG. 7.

FIG. 7b shows a set of waveforms produced or used in the circuits of FIGS. 7 and 7a.

FIG. 7c shows DCS action of the FIG. 7 circuit.

FIG. 8 is a circuit diagram of a DCS display using an amplitude modulated ramp color separation waveform including connections thereto and APC.

FIG. 8a is a diagram of a novel index pattern used in the APC circuit.

FIG. 8b shows the APC circuit waveforms.

FIG. 10 is a diagram of a unique combination of a single tube color display output screen coupled to optical elements for providing a projection display.

FIG. 11 is a high brightness color display comprising in combination a DCS display circuit, a tricolor filter and a Schlieren light valve electro-optical projection system.

FIG. 11a is a color filter shown in plan view.

FIG. 11b is a partial side view of a lens system for use with a filter such as that shown in FIG. 11a.

FIG. 12c shows a timing modification from FIG. 12a.

DETAILED DESCRIPTION OF THE DRAWINGS

Figure 1:
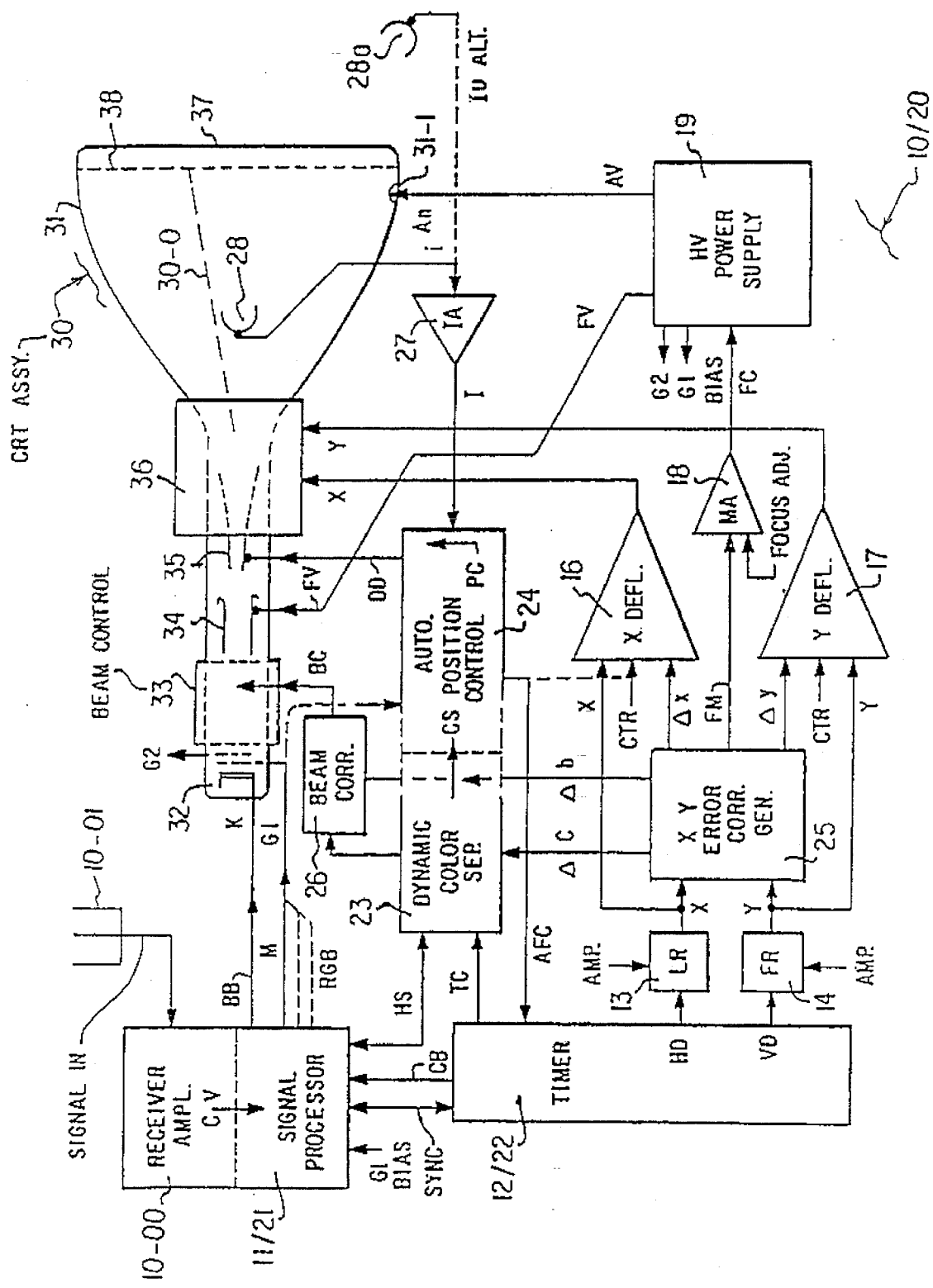
FIG. 1 is a schematic and block diagram of a DCS system in accordance with the invention.

FIG. 1 of the drawings is a block diagram of dynamic color separation display systems 10 and 20. Systems designated by the reference numeral 10 have circuits which generally conform to currently used color display practices, and systems designated by the reference numeral 20 provide alternate function blocks for achieving dynamic color separation embodiments further described herein. Either system employs electron beam control elements of a CRT assembly designated by reference numeral 30, which may provide either one or three electron beams or beam groups as described in further detail herein.

The input to system 10 or 20 is shown by way of example as a standard receiver/amplifier 10-00 and having a receiving antenna 10-01. Reception may be by typical TV broadcast, VCR, cable, ITSF, satellite or others, and signal generation may be by any of several known means including broadcast, computer, a graphics generating system or file. The output of receiver 10-00 is a composite video signal CV having time synchronizing components, a luminance information component, and a chrominance information component. The systems will be described in this application with respect to NTSC timing, luminance Y and chrominance C, although other signals having equivalent basic information content may be equally well applied.

Signal CV is applied as an input to signal processor 11 or 21. The timing content is separated and sent to timer 12/22 as a composite sync signal. Processor 11 coverts the Y and C signals of the composite video into the primary color video signal components R, G and B in well known manner and these are connected to red ($G_1R$), green ($G_1G$), and blue ($G_1B$) grids of a CRT gun 32-03 where they control respective red, green and blue beam currents, thereby controlling both brightness and color content of the display. The primary function of processor 21 is to convert Y and C into a less well known pair of components, M and S, which are, however, generally more suitable to use in DCS systems. Signal M is the monochrome or equal brightness video signal, and it is connected to grid G1 of either conventional gun 32-00 or shaped beam gun 32-01, or to 32-02 having three shaped beams with one beam current control which controls display brightness. The signal S is generated by dividing chrominance (after it has been circularized as discussed in U.S. Pat. No. 3,312,779 by luminance on an instantaneous basis;

$$S = C/Y \tag{1}$$

The phase of S, as did the phase of C, contains the information as to the dominant hue of the color to be reproduced, and the amplitude of S is proportional to the degree of color saturation of the color. For reproduction of a saturated primary, signal S is at maximum (100%). For reproduction of 50% saturated primaries or saturated complementary colors, S is at 50% and for reproduction of white or monochrome, S equals zero.

The S signal may be further processed in a variety of ways to meet the requirements of various color separation methods, but in each version the hue-saturation information is sent as a HS signal or signal components to the dynamic color separation circuits of block 23. The monochrome signal M (or equivalent) may also be sent to automatic position control circuit (APC) 24 where it is used to remove brightness information from index signal I content.

Timer 12 is of conventional form and separates composite sync into line (H) and frame (V) scan sync pulses used to sync the corresponding scans of the deflection raster which are connected at timer outputs HD and VD. Timers 12 and 22 also separate the chrominance subcarrier burst, to which is locked a reference subcarrier oscillator providing output signal CR (see FIGS. 2d and 2e) which may be fed back to the signal processor or may comprise a component of time control signal TC connected to dynamic color separator 23.

Figure 2A:
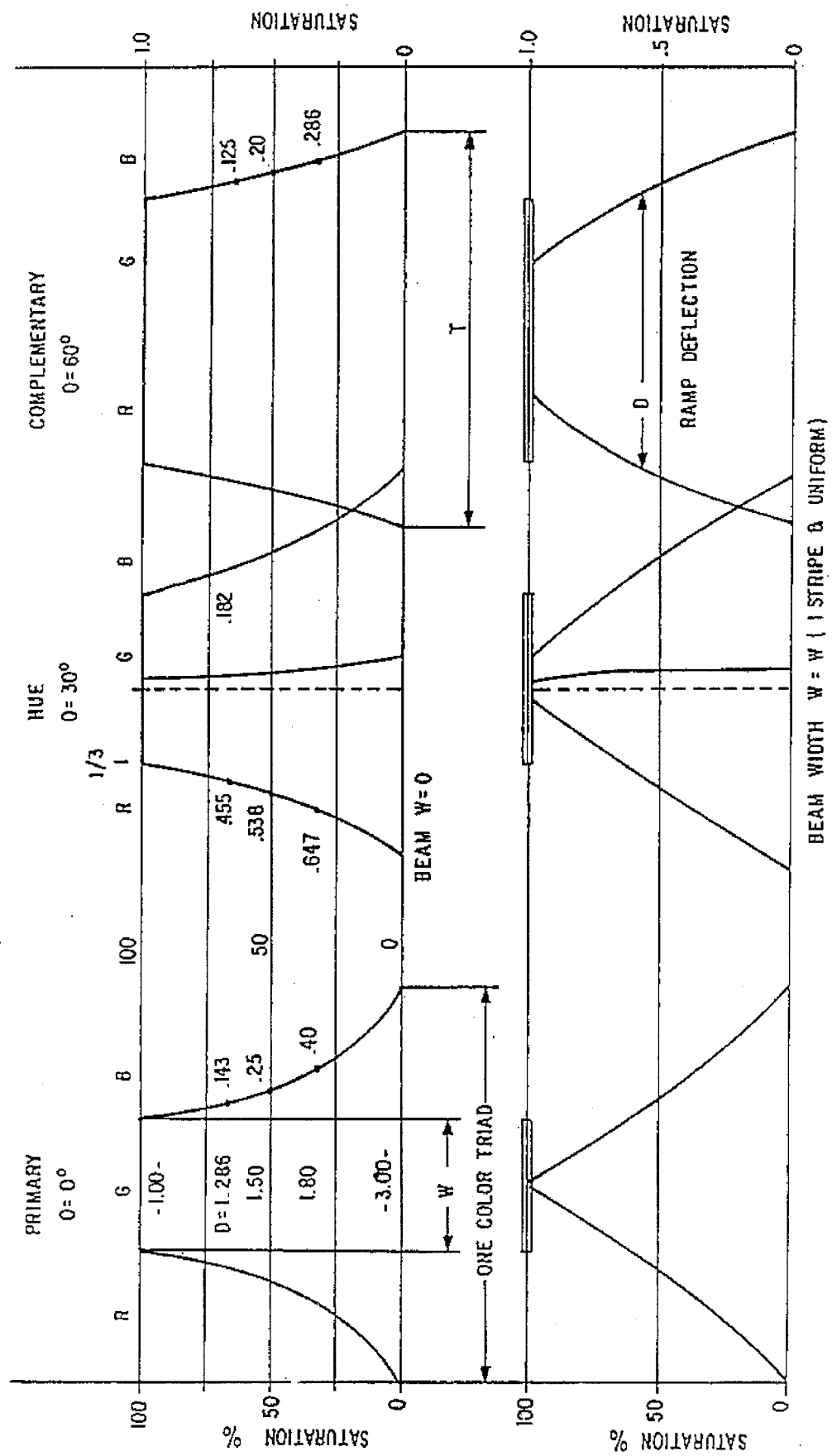
FIG. 2a is a set of graphs depicting color errors as a function of NTSC signal hue and saturation for two selected beam widths.
Figure 2B:
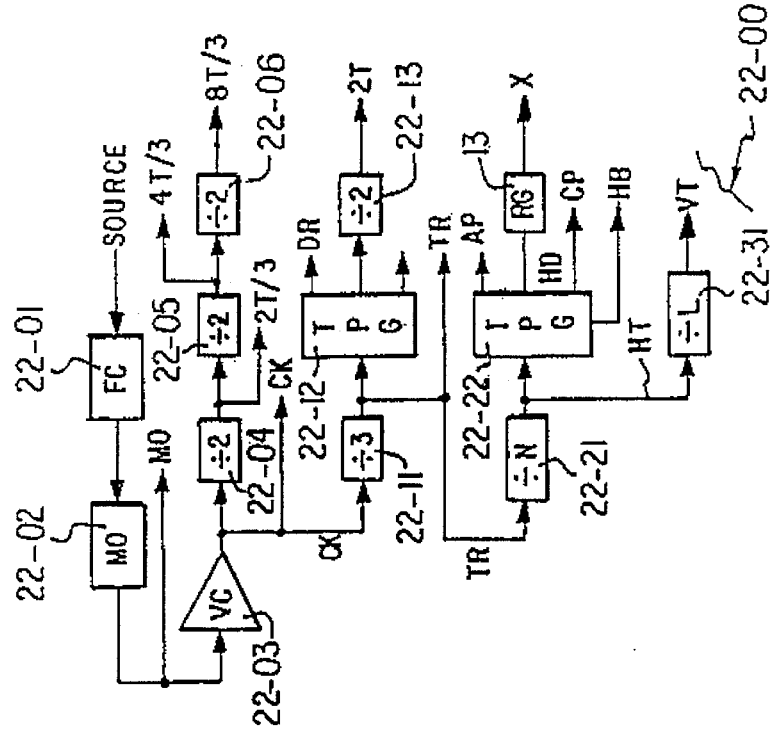
FIG. 2b is a block diagram of a timing circuit for producing waveforms useful in applying corrections to beam scanning voltages in accordance with the invention.

Timer 22, shown in detail in FIG. 2b, provides a substantial number of inter-related timing waveforms 2c useful for implementing the signal processing at 21, dynamic color separation at 23, automatic position control at 24, and beam correction at 26 as well as for raster scan control. Horizontal drive HD and vertical drive VD control pulses are connected to and used to precisely time a linear line scan ramp LR generator 13 and a field scan ramp FR generator 14. Timer 22 provides a precise time lock among the raster scan, the pattern of color reproducing pixels, and the associated index pattern on the CRT screen format area 38. Finally, timer 12/22 provides a composite beam blanking signal CB which is fed back to the signal processor for providing beam blanking signal BB shown connected to the cathode 32 of CRT gun 31. This signal may also contain beam turn-on signals at a specified level and at specified positions on the raster and used for APC control.

CRT beam forming and beam control assembly 30, in preferred embodiments detailed in FIG. 3, has a CRT envelope 31 containing beam forming gun structure 32, elements for beam grouping, shape, and distortion control 33, a focus electrode 34, minor color separation deflection plates 35 and a faceplate 37 having a screen 38 disposed on its inner surface and impinged by electron beams 30-0. The function of plates 35 may alternatively be combined in electrode structure 33. Additional magnetic elements of control means 33 and major magnetic deflection yoke 36 are mounted on the neck of the CRT.

Output X of line ramp generator 13 is applied to X deflection amplifier 16 whose output drives X deflection coils of yoke 36. The output Y of field ramp generator 14 is applied to Y deflection amplifier 17 whose output drives Y deflection coils of yoke 36 thereby to cause the beam 30-0 to perform a raster scan over the screen 38 area. The CRT is energized by high voltage HV power supply 19 which provides a beam accelerating potential AV to an anode input 31-1 of bulb 31, a focusing potential FV to focus electrode 34, a G2 potential to grid or grids G2, and a negative bias potential to control grid or grids G1 of electron gun 32.

The description of FIG. 1 up to this point has related to portions capable of providing typical monochrome B/W or features of typical color displays. To provide true color output, dynamic color separation requires precise matching of the electron beam spot to the color elements at each pixel over the full scan area. The systems various processes, however, introduce errors in beam shape and size as well as in its relative position. A viable DCS display requires correction of these errors for a given system. Accordingly, XY error correction generator 25, APC circuit 24 and beam correction drive circuitry 26 are provided to make these corrections.

Errors in position of the electron beam herein referred to as geometric distortions become quite large for wide angle CRT's and the errors may be separated into x and y components along the X and Y axes respectively. The errors in the direction of color separation typically normal to the color triads, are substantially more critical, but some correction to both axes is generally desirable. A waveform corresponding to the error x over a full raster scan may be expressed by a power series in x and y. For the x signal, the principal components are:

$$\Delta x = C + Ax_1 y + L(x^2 - 1) + b(y^2 - 1) + Txy + Rx(x^2 - 1) + Pxy^2 \tag{2}$$

A similar equation applies to y terms, to the extent required. The same form of equation, but which may have substantially different magnitudes for the terms is applicable to the other corrections of FIG. 1.

The X and Y ramp signals are input to correction generator 25 which may use any of several methods to generate its output signals. One method uses multiplier circuits to generate the terms directly as given by equations similar to 2. Generator 25 has outputs Δx and Δy connected to X and Y deflection amplifiers 16 and 17 respectively. These outputs are adjusted to cancel beam position geometric distortions thereby matching the raster scan to the display format. Generator 25 provides a beam focus modulation output signal FM as input to modulation signal MA amplifier 18 also having a level control for exact adjustment of beam focus and having an output focus control signal FC. In a preferred embodiment, the CRT is of a variety generally referred to as high voltage electrostatic focus. The supply has a floating section generating output voltage FV which is connected to focus electrode 34. The control signal FC is connected to the low voltage end of this supply section and its focus modulation and focus adjustment signal is transferred via FV to the focus electrode thereby to provide precise beam focus over the full format area.

Generator 25 provides signal b having components for correcting beam distortions as a function of raster scan position. The corrections include beam width control, astigmatism distortions and beam rotation. The signal b is fed to beam correction driver circuit 26 whose output beam control signal BC drives the control elements 33 of CRT assembly 30. Signal c from error correction generator 25 contains components which correct for change of deflection sensitivity vs. position. Signal c is input to dynamic color separator 23 where it may be used directly to modulate color separation waveforms or is indirectly routed to beam corrector 26 or back to change the control signals of processor 21.

Dynamic color separator 23 receives time control TC information and hue and saturation HS control information from which it generates a composite color separation CS waveform. Preferred embodiments will be more fully described. However, the function of the color separation waveform is to apportion beam dwell on the phosphor stripes of each triad or other pixel equivalent as it scans by in accordance with the color content prescribed by the saturation signal S. This is basically accomplished by positioning the point of maximum beam arrest at the dominant hue position of the triad and modulating the arrest waveform in a manner to achieve the correct mix of dominant hue and white output. Index detector 28 or 28a generates an index signal i as a result of beam impingement on the index pattern of screen 38. In preferred arrangements, index detector 28 is one or more photo-detectors located to receive radiation from UV-emitting index stripes on the back of the display screen or to pick up the RGB display output directly. Index signal i feeds IA amplifier 27 to provide therefrom an output signal of usable level I which is input to APC block 24. Signal I may be processed in several ways and compared to known parameters of the color separation signals, to be more fully described. Errors in the comparison process are detected and used to generate a position control PC output signal and/or subcomponents thereof such as AFC or automatic centering. Signals PC and CS are summed in an output driver stage of 23-24 providing color separation deflection drive signal DD to the minor deflection plates 35 of CRT 31 thereby to provide a dynamic color separation display. The plates 35 could, alternatively, be a minor deflection yoke.

FIGS. 2a through 2e illustrate errors in prior dynamic color separation processes and circuits for the correction of these errors in accordance with the invention.

Errors arise from several sources, and FIG. 2a graphically illustrates some relationships which contribute to these errors.

When color signal specifications such as NTSC were established, there was no concept of dynamic color separation. The signals prescribed by NTSC are sine waves having vector values representative of color parameters at particular instants of time. These values have no relationship to the width or distribution of the scanning electron beam or to the discontinuous nature of the color triad scanned by the beam. Many prior DCS systems are based on theoretically idealized conditions which are impractical. For example, these theoretical beams have zero width or abruptly rising profiles of unit amplitude and width. High color performance in a practical system requires means for correcting the discrepancies between the values provided directly by the video signal and the requirements of the DCS display.

FIG. 2a illustrates how certain errors arise in a DCS system. This figure comprises six graphs which show the required DCS beam scan amplitude D (equal to composite deflection, FIG. 8) plotted in relation to the R, G and B stripe positions of a triad plotted along the horizontal axis as a function of the saturation S of a color from zero saturation to 100% saturation plotted along the vertical axis.

The plots are centered on and taken at hue values corresponding to zero phase for reproduction of a primary color, at an intermediate color corresponding to a 30° phase shift, and at a complementary color corresponding to a 60° phase shift in which the beam is centered over two stripes. Since the plots are repetitive for each stripe, they illustrate behavior at 12 points across the 360° hue spectrum. They also show that the errors repeat at 3 times the triad frequency.

The top row of plots represents a beam width of zero, and the bottom row represents a beam of uniform distribution and maximum allowable unit width (i.e., a width of one stripe). It may be noted at this point that FIG. 2e shows these among several examples of beam profile distributions.

The significance of the plots of FIG. 2a may be readily grasped from the fact that a dynamic separation technique can convert directly from the S signal without error only if the plots are straight lines. The plots are not linear because the hue and saturation relationships established by the NTSC signal, where the instantaneous amplitude is proportional to the saturation, do not account for the fact that the electron beam must physically scan a phosphor to produce a color and must have a finite width.

The relevant conclusion which may be drawn from FIG. 2a is that either the width of the beam or its position with respect to the three color phosphors must be shifted as a function of the hue and saturation to correct for errors in linearity.

Figure 2C:
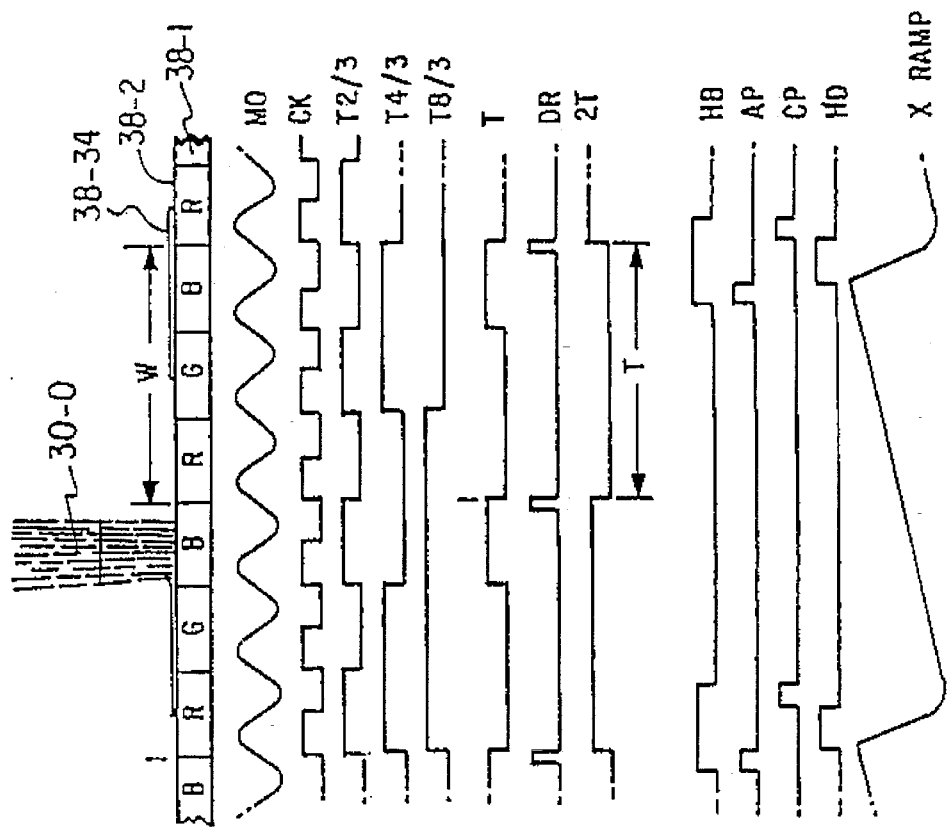
FIG. 2c is a set of waveforms produced by the circuit of FIG. 2b.
Figures 2D, 2E:
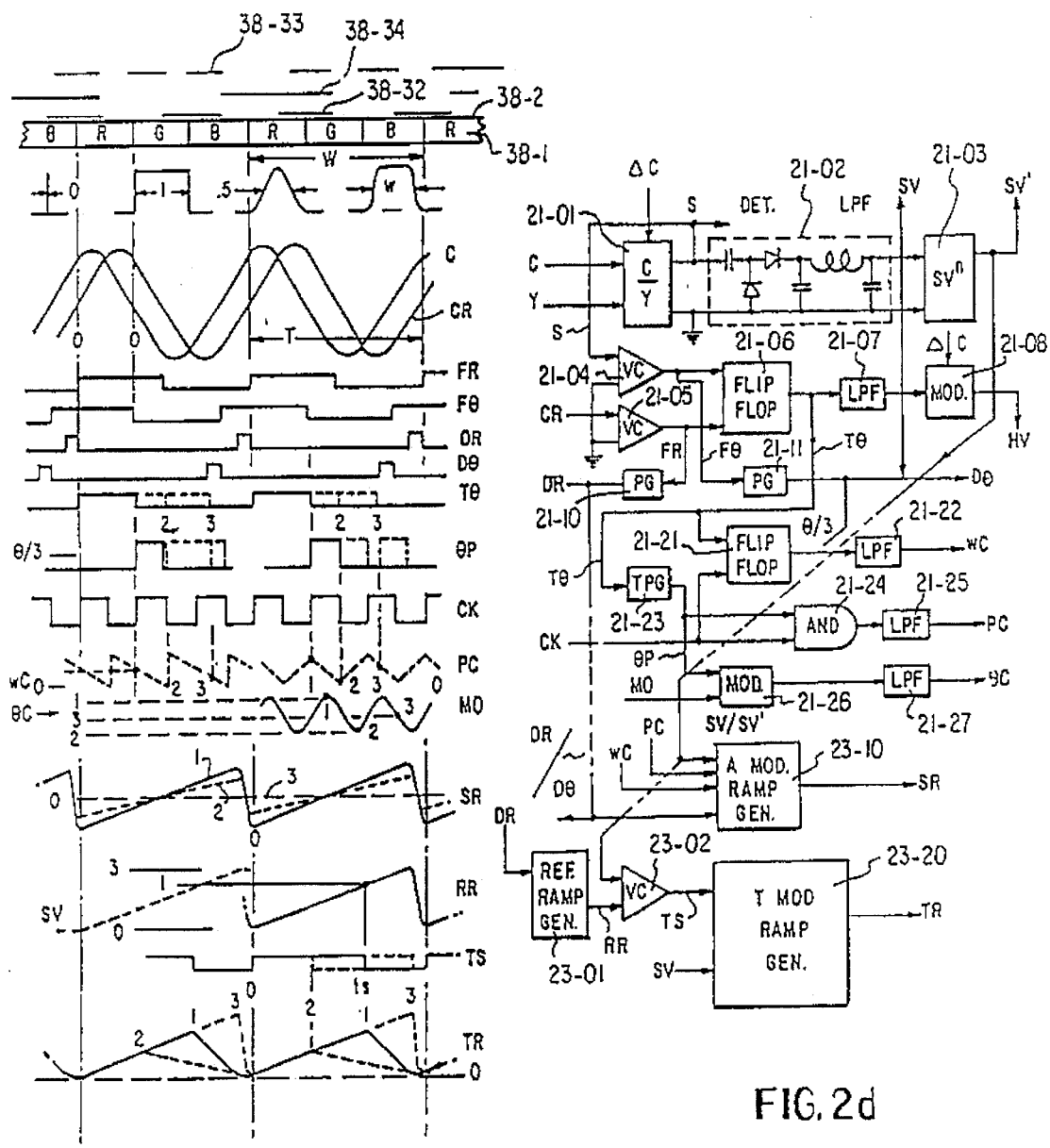
FIG. 2d is a block diagram of circuits for generating control and correction voltages in accordance with the invention.
FIG. 2e is a set of waveforms produced by the circuits of FIG. 2d.

Referring now to FIGS. 2b and 2c, FIG. 2b is a block diagram of a timer for producing waveforms useful for applying correction voltages for correcting errors such as those illustrated by the plots of FIG. 2a. It also provides the other timing signals unique to and required by DCS systems described herein as well as the essential timing found in a conventional sync generator IC chip. FIG. 2c illustrates a small section of a display screen pattern (also see FIG. 1, reference numeral 38) and a set of waveforms generated by the circuit of FIG. 2b.

The display screen has triads of RGB phosphor stripes 38-1 of triad width W, an aluminized backing layer 38-2 and an arbitrary indexing pattern 38-34 placed on layer 38-2 in a specific relation to the stripes 38-1. Electron beam 30-0 scans the screen with a velocity V=W/t of line scan deflection where T is the period required to scan across one triad.

Timer 22-00 (FIG. 2b) includes a master oscillator 22-02 which produces an output waveform MO which is maintained at a frequency having a period of T/3 by an AFC control signal from frequency control (FC) 22-01. The frequency control may operate by any of several known means, such as harmonic generation from the chrominance reference signal, beat frequency heterodyning, or an AFC voltage control signal generator. The master oscillator feeds voltage comparator (VC) 22-03 to generate output clock pulse CK. The MO and CK waveforms will be used to generate correction signals.

The clock signal CK is fed to a chain of ÷2 circuits 22-04, 22-05, 55-06, to provide output timing signals at 2 T/3, 4 T/3 and 8 T/3 for automatic position control timing. For example, the 4 T/3 waveform corresponds to the timing of the index pattern 38-34 shown in FIG. 2c. Clock signal CK is also supplied to ÷3 circuit 22-11 which provides triad reference timing waveform RT. This triad reference RT feeds time pulse generator 22-12 which may be configured to provide any of several miscellaneous timing waveforms such as reference drive pulse DR which will be used to generate ramp color separation signals. Generator 22-12 also triggers ÷2 circuit 22-13 whose output 2 T will be used to provide bi-directional automatic position control. Triad reference triggers a ÷N chain 22-21, where N is the number of triads corresponding to a complete horizontal line scan interval for a specific display screen, and the output is line scan frequency signal HT. The line scan frequency signal HT triggers time pulse generator 22-22, an output of which is horizontal drive pulse HD which controls ramp generator 13 of FIG. 1 in accordance with the waveform timing shown by FIG. 2c. Signal HT also triggers a ÷L chain 22-31 to provide a vertical rate timing signal VT (by way of one example-NTSC would trigger from HT/2). Horizontal time pulse generator 22-22 is shown generating automatic position control signals AP and CP as well as a horizontal blanking signal HB, and the timing of these signals relative to HD and X ramp is shown. These signals are used in a preferred embodiment for APC control.

FIG. 2d shows a block diagram which generates a number of control signals, correction signals and color separation signals. The signal waveforms shown in FIG. 2e are all plotted to a common time base for purposes of comparison and timing is directly correlated to triad position on a section of screen 38-1, similar to FIG. 2c, which is shown together with its backing layer 38-2 and three alternate index patterns 38-32, 38-33 and 38-34. The beam profiles of zero width, unit width, 0.5 width, which would be the maximum allowable width from a typical gun of conventional design, and a preferred beam profile of width "w" to be provided by improved gun design of FIG. 3, are shown in FIG. 2e in relation to the color strips of 38-1.

The inputs to the circuit of FIG. 2d are the luminance Y, chrominance C and reference signal CR from receiver 10-00 output CV. These signals need not be at period T or have a direct relation thereto, but the information ratios they convey do have a direct relation so the signals or their conversions are shown at period T to conveniently convey the relationships. The signals MO and CK from the circuit of FIG. 2b are also inputs and are plotted to scale in FIG. 2e. Signals C and Y are input to divider 21-01 whose output is S (see equation 1). Input signal "$\Delta c$" modulates the amplitude of signal S to match the change in deflection sensitivity over the format to provide constant color separation action. Signal S is amplitude detected and filtered by a low pass filter in circuit 21-02 having response corresponding to the maximum rate of change of signal S thereby providing output saturation voltage signal SV whose amplitude is proportional to color saturation. SVn converter 21-03 provides a non-linear output SV'.

Signal S is input to and clipped by voltage comparator 21-04 to produce output square wave frequency F$\Theta$. CR is input to and clipped by voltage comparator 21-05 to produce output square wave reference frequency FR. FR and F$\Theta$ provide triggers to a flip-flop 21-06 to produce an output pulse T$\Theta$ whose time interval is the same as the hue phase shift of signal S. T$\Theta$ is filtered by low pass filter 21-07 and amplitude modulated in modulator 21-08 to produce an output hue voltage signal HV whose amplitude is proportional to hue shift. FR and F$\Theta$ are input to pulse generators 21-10 and 21-11 respectively, generating output drive pulses DR and D$\Theta$.

The above described waveforms produced by the circuits of FIG. 2d as outputs of signal processor 21, FIG. 1, are alternate ones of which may be used for control of DCS as will be described in specific embodiments. The next set of waveforms to be described provide corrections for DCS circuit errors as discussed in FIG. 2a.

Waveforms T$\Theta$ and CK are applied to trigger flip-flop 21-21 to produce output waveform $\Theta/3$. The falling edge of T$\Theta$, which corresponds to hue phase $\Theta$, triggers the output $\Theta/3$ of the flip-flop 21-21 positive, and the next negative CK transition triggers it back negative, where it stays until the next negative transition of T$\Theta$. As hue changes, causing T0 to shift from position 1 (shown solid), to position 2, to position 3 of FIG. 2e, the pulse width of $\Theta/3$ changes correspondingly as illustrated by the dotted lines. Thus when $\Theta$ is at position 1, $\Theta/3$ goes positive and is triggered back by CK at the center of the green stripe generating a one-half stripe width pulse. At position 2, positive triggering occurs just after the green center line producing a wide pulse which returns at the blue center line whereas at position 3, occurring just before the blue center line the $\Theta/3$ pulse is narrow. This action will be repeated in relation to each color stripe; e.g., three times per triad for hue shift $\Theta$ from $-180°$ to $180°$. The signal $\Theta/3$ is passed through a low pass filter 21-22 to produce its average value as a voltage signal $_wc$. The voltage change of $_wc$ as a function of hue shift is shown by the dashed ramp-like waveform below the CK pulse at left, with dots showing the voltage levels corresponding to the phase shift positions $\Theta$ of the example. It repeats three times per triad. If the 50% duty ratio signal (position 1 corresponding to a stripe boundary) is taken as a reference level, then the signal has an abrupt negative to positive voltage shift at the center of each stripe. This shift may be used for hue error correction when added to the hue control in the DCS circuit block, as will be shown in specific embodiments. Its action may be understood by the following example. Consider a beam having w=0.6 W. Then adjust $\Theta/3$ amplitude to cause a 0.4 W beam shift as $\Theta$ reaches the center of each stripe. The beam is thereby shifted from having an edge at one stripe edge to having an opposite edge at that same stripe's opposite edge at each transition. This provides a smooth and uniform hue shift for each 120° of $\Theta$ shift.

A second correction signal PC is generated by applying T$\Theta$ to a time pulse generator 21-23 which generates an output pulse $\Theta$P having its rising edge at hue angle $\Theta$ and having a constant pulse width of T/6. This is the same width as the clock pulse, and $\Theta$P and CK are the inputs and AND gate 21-24 whose output is passed through low pass filter 21-25 to develop voltage signal PC. As for $_wc$, the shift in PC is shown by the dashed curve with values shown for positions 1, 2 and 3. This signal goes from zero at primary hues to maximum at complementary hue positions and may be used to correct the saturation level of NTSC, for example, as will be described for FIG. 9.

It will also be described in other embodiments in connection with beam width modulation capabilities to be described for FIG. 3. In such applications, the 50% amplitude of PC corresponding to 30° hue may be used as a reference level in adjusting the beam width to equal the stripe width W. The PC signal is then used to modulate the beam to be less than W at primary positions and more than W at complementary positions.

A third correction $\Theta c$ uses the master oscillator waveform MO and OP. These signals are applied to modulator 21-27. The corresponding shifts for $\Theta c$ provide a signal difference to shift the 30° hue points.

There has been shown a number of generated correction signals which may be used to control or correct the color display parameters to provide precise color output reproduction for specific embodiments. The remaining circuit blocks of FIG. 2d and waveforms of FIG. 2e are concerned primarily with the generation of DCS block 23, but some also apply to APC circuits of block 24. Embodiments will be described using alternative waveforms for the purpose of dynamic color separation. The first of these is saturation signal S and variations thereof. A second method uses an amplitude modulated linear ramp SR and a third method uses a time modulated double ramp TR. These ramps may be timed either at a reference phase by signal DR or at hue phase by signal D$\Theta$.

Ramp generator 23-10 generates output ramp SR. Its input controls include the drive pulse DR or D$\Theta$. DR control is shown and it causes rapid retrace of the ramp at time t=0. Input SV or SV' modulates ramp amplitude linearly or at a non-linear correction rate to match system parameters as has been disclosed. Alternatively, correction $\Delta c$ and PC may be summed with SV at generator 23-10 input to provide ramp amplitude corrections as a function of color saturation. SR output is shown solid at a maximum amplitude at 1 which causes full electron beam arrest when applied to deflection plates 35; 50% saturation results in waveform 2, shown dashed, and when S is zero, waveform 3 is zero allowing beam scan by the major deflection line scan to reproduce B/W output. Note that ramp amplitude has been modulated by signal $\Delta c$ (at divider 21-01) so that beam arrest remains the same over the full scan.

Block 23-01 is a substantially constant amplitude reference ramp generator having output waveform RR which is shown using input drive pulse DR. It will be used as a color separation waveform causing full beam arrest and having c modulation as has just been described. Herein it is used as a time pulse generator at fixed amplitude equal to SV signal amplitude wherein SV has no c modulation. RR and SV, whose equal signal excursion is shown alongside RR, are the inputs to voltage comparator 23-02. The output is saturation time pulse TS. By way of example, when RR amplitude reaches SV level as shown at position 1, the voltage comparator transition occurs at time $t_s$=S T. Thus, the "on" time is proportional to the saturation level of S and the TS signal output of VC 23-02 provides the time control input to ramp waveform generator. 23-20 whose output is dual slope ramp TR. Positions 2 and 3 (dotted) show the change in TR waveform as SV amplitude changes. The positive slope is such as to maintain beam arrest during time $t_s$ thereby producing a saturated color. During the negative slope the beam scans the triads uniformly, thereby producing white. When S is a maximum, (3) the beam is arrested full time producing a saturated hue. As S goes to zero, a B/W output is produced. Thus, waveform TR controls the saturation level of the display. The change in slope shown at 4, which occurs due to modulation by $\Delta c$, causes equal beam arrest to occur at all positions of the scan. Modulation may also be applied by signal PC and/or a portion of S to cause the beam to have full arrest in reproduction of primaries and not to fully arrest, therefore to allow the beam to travel as much as a stripe width, in reproduction of complementary colors.

The waveform generator of 23-20, in contrast to previously described circuit blocks, is not well known in the prior art and a preferred embodiment will be described in detail below.

FIG. 3 is a detailed sectional diagrammatic representation of the CRT assembly 30 taken in the X-Z (horizontal) plane with the X dimension expanded to show details more clearly. As also shown in FIG. 1, there is a CRT bulb 31, a section of the glass envelope of which is shown at 31-0 beneath the deflection yoke 36, which is shown in partial section. The bulb has conventional inner electrostatic shielding conductive surface 31-2, usually aquadag, and is sealed to faceplate 37 whose inner surface supports display screen 38. The screen 38, also referenced in FIGS. 2c and 2e, has a repetitive pattern of primary color producing phosphors 38-1 typically in the form of triads of either vertical or horizontal stripes distributed across the faceplate. An aluminized backing layer 38-2 may support a pattern of index elements 38-3, which are preferably UV-emitting phosphors (several patterns of which are shown in FIG. 2e), and the aluminum layer is connected to conductive layer 31-2 which contacts with anode connector 31-1 (FIG. 1) and to anode 32-4 of electron gun assembly 32-0.

The electron beam forming gun structure 32-0 has a conventional heater (not shown), a common cathode 32-1 (K) a single or multi-aperture (shown) grid structure 32-2 (G1) which may have one beam control grid 32-21 (see FIG. 3a) or three grids 32-2 R, 32-2 G and 32-2 B, a common grid (G2) 32-3 having an aperture pattern to match the apertures of G1 and a beam accelerating anode (an) 32-4 as noted above. A focus electrode (F) 34-1 cooperates with accelerating anode 32-4 to form an electrostatic field which focuses the electron beams at the CRT screen in a pattern similar to that of the grid apertures through which they came, the pattern being designed of prescribed size and shape to match the phosphor stripes of a screen pixel as shown, for example, in FIG. 3d. The grid pattern is shown in FIG. 3a looking toward the cathode with grid G2 removed. Each grid element is shown with 3 apertures and FIG. 3b shows a side view of the current energy density profile of the beam current from each aperture similar to beam w of FIG. 2e. The apertures are sized and spaced with web thickness are adjusted so that the energy distributions overlap and combine to provide the beam profile shown in FIG. 3c. The result is a beam having steep edges and relatively flat distribution designed to match the line-to-line spacing of the raster scan. Such matching is precise to an extent unprecedented in the art. Such a structure results in a substantially uniform current density and lower loading, hence longer life, both at the cathode surface and at the screen pixel being energized and provides a correspondingly higher display brightness. The process described can be carried beyond the example shown to provide enhanced results by using more apertures. Alternatively, grooved cathode surfaces, FIG. 3e are matched to the grid 32-2 aperture group or groups. As described in U.S. Pat. No. 3,914,651, FIGS. 6, 7, the groove is curved so as to provide a substantially uniform emission over a limited groove arc. Display embodiments will be described employing four different gun combinations.

Gun 32-00 is of conventional single aperture construction. Gun 32-01 has a single multi-aperture element (G1) 32-21, and G2 apertures to match, gun 32-02 has a single grid G1 in which elements R, G and B are connected together as grid 32-22 and form three beams of three groups each, and gun 32-03 has separate grids 32-2 R, G and B providing for independent beam current control of each beam group. Further features associated with each gun will be described in connection with their function.

Beam control structure 33 (FIG. 1) comprises means for control of beam distortions resulting from deflection which will cause mismatch of the beam pattern to the pixel pattern. Component 33-3 is an astigmator coil and it is driven by a component of signal BC adjusted to maintain beam pattern shape during full, raster scan. Rotation coil 33-2 provides a Z-axis magnetic field, and it is similarly driven to eliminate beam pattern rotation. Deflection plate assemblies 33-10 and 33-10a are examples of alternate means for controlling convergence or divergence of the outside electron beam groups of beams 30-0 in guns 32-02 and 32-03. The beam convergence deflection plate structure of 33-10a assembly, in which the three beams pass between four plates, is prior art used in many in-line shadow mask CRT's. Preferred coupling herein is not. See U.S. Pat. No. 3,914,651, FIGS. 4 and 5. The two inside plates of 33-10a are connected to anode 32-4 and have no influence on the center beam. The two outside plates are connected together and to the anode through a high resistance. They are capacitively coupled through the glass neck of the CRT to terminal C1a by means of conductive areas inside and outside the neck as illustrated. A plus input voltage to C1a diverges the outside beams and a negative voltage converges them. In assembly 33-10 there are four plates, 33-11, 33-12, 33-13 and 33-14. When used with the above three beam guns, plates 33-13 and 33-14 connect to G2 and plates 33-11 and 33-12 are brought out at pins C1 and C2. Since they operate at normal voltage, they may be driven directly and provide both convergence and a small amount of beam width control. In single beam gun 32-01, plates 33-13 and 33-14 are not used. Plates 33-11 and 33-12 are located more approximate to the 33-13 and 33-14 positions and operate to provide a small amount of beam steering and beam width control. Terminals C1 and C2 may therefor serve to provide a degree of output color correction as described for FIG. 2e. Plates 31-11, 32-12 provide improvement to the split G2 electrodes of reference U.S. Pat. No. 3,914,651, FIG. 6, wherein differential voltage provides the minor deflection for DCS beam steering and common mode voltage to both electrodes provides the beam width control especially for edge or peripheral electrons. The isolated electrodes may be proportioned so that nominal control voltage level is near zero rather than at G2 potential.

Minor deflection structures 35-1 and 35-2 provide capacitive coupling, in a manner described above, from low voltage inputs D1 and D2 to deflection plates 35-1 and 35-2 which are connected by high resistance to the anode potential of anode 32-4. A detailed description of this may be found in U.S. Pat. No. 3,914,651 (FIGS. 4 and 5 thereof). The plates provide minor beam deflection for dynamic color separation and its automatic beam position control.

The beam or beams 30-0 are shown at zero major deflection in alignment with a color triad having width W. When the beam is deflected horizontally at angle i, the beam intercept of W is the distance $W_i$ normal to the beam as given (for H) by the accompanying equation and parameters shown. The example illustrates the modulation which is applied to color separation signals to that they match the color triads.

A thin annular ferrite disc 34-2 is sandwiched between front and rear core sections of deflection yoke 36 for providing an axial high strength permanent magnetic focus field cooperating with the electrostatic field of electrostatic lens electrode 34-1 and 32-4 to focus the beam at the CRT screen. Movement of the focus toward the screen provided by 34-2 reduces beam size but the distance forward which can be utilized is limited by interference of the deflection field.

It will be appreciated that a number of basic elements of DCS displays in accordance with the invention have been described. A variety of embodiments will now be described.

The embodiment shown in FIG. 4 demonstrates two concepts. First, it discloses a method whereby the sine wave saturation signal S may be used directly as the DCS waveform with triads transverse to line scan. It will be shown that the sine wave cannot provide 100% beam efficiency but provides circuit simplicity. Accordingly, other elements in this example, including single aperture gun 32-00, are selected to provide a simple display. Second, a unique combination is employed to meet the beam position control requirements imposed by DCS. A form of APC which has two index elements, one at each side of the screen format edges, is used. This arrangement precisely controls centering and amplitude of line scan to match the edge triads. An error correction generator then provides position control within the format the item of major significance being line scan linearity. The APC may be used with any of the methods of color separation and with any adequately precise linearity correction generation method, but combination of the three is essential to achieve a DCS display.

The display may work directly from NTSC. However, to achieve higher resolution, the frequency of the signal S is doubled while retaining both hue and saturation content. The phase of the frequency-doubled S signal causes beam arrest to occur at dominant hue during deflection across triads. The S sine wave signal is not capable of complete color separation alone, and M, therefore, does not provide true brightness output. A new version of brightness signal B is generated to overcome these deficiencies. It uses the C, Y and S signals in combination to control the purity of the dominant hue and to correct brightness in a manner to be described.

With reference to FIG. 4, a block diagram showing the above elements of a display 10-4, the divider 21-01 of FIG. 2d has inputs C, Y and Ac and an output 2 S feeds drive amplifier 32-46, thereby driving minor DCS deflection plates 35 of CRT 30-4 to provide color separation. Signals C, Y and S are also connected to inputs of video signal processor 21-4 whose output provides a video brightness signal B shown connected to the grid G1 of CRT gun 32-00. Horizontal sync signal H (from FIG. 1, block 12) triggers the time pulse generator 22-22, and its outputs HB, AP & CP (see FIG. 2c) are applied to generator 21-4 where they blank out video, interferences, etc. during retrace and output signal BB fed to the cathode establishes reference values of beam current during pulse times AP and CP. Output HD drives LR ramp generator 13 whose output X fees amplifier 16 which drives yoke 36 as is described in FIG. 1. Signal X is also applied to XY error correction generator 25-4 whose input/output signals and function have been described. These functions may be generated by either of several methods which include the use of analog multipliers, operational amplifier integrators and programmable read-only memories (PROMs). Where the display inputs are desired to be digital X/Y signals, the corrections may also be applied to multiplying DAC's. In this embodiment, signal Δb is fed to beam correction drivers 26-4 which drives only a dual coil quadripole astigmator 33-3. The astigmatism field is adjusted to provide a beam elongated nominally in the vertical direction parallel to the stripes, but Δb is used to control both magnitude and direction (rotation) of the astigmatic beam so that it matches pixel size at all scan positions.

CRT assembly 30-4 has no rotation coil or beam convergence elements and has only two index elements 38-3A and 38-3C. These are narrow strips, each of which is located on a respective side of the screen patter, parallel to and at a small predetermined distance beyond the end triads. The strips are preferably conductive elements isolated from the CRT coating 31-2 but connected thereto, hence to the anode 31-1, by means of high resistance elements R1 and R2. Index signals $i_1$ and $i_2$ are pulses resulting from direct beam impingement and their amplitudes are proportional to the fixed amount of beam impingement provided by signal BB. These pulses are coupled through C1 and C2 and applied, respectively, to position error detectors ACC, 24-4c and AAC, 24-4a where they are compared to the time pulse inputs CP and AP from generator 22-22 as described with reference to FIG. 2b. The error output of detector 24-4c is Connected to the centering control input of deflection amplifier 16 and adjusts the line scan start position to match the first color triad. The error output of detector 24-4a is connected to the amplitude control input of line scan generator 13 and adjusts the line scan amplitude to match the last color triad of the format.

FIGS. 4a and 4b illustrate the behavior of the color reproduction features of display 10-4. The parameters shown are chosen to obtain large usable arrest during production of a saturated primary color to provide optimum brightness. FIG. 4a shows a pixel a one triad section of the display screen. FIG. 4b shows an X ramp scan across the section versus the time scale corresponding to production of B/W output and a composite scan causing maximum arrest on green (as an example) corresponding to saturated primary hue. In the example, S amplitude is 0.23 W, beam width is ⅔ the stripe width and the arrest interval $T_G$ on green is 0.58 T as shown. FIG. 4b also shows the time intervals the beam spends fully on each stripe in crossing the red and blue stripes, and any beam current outside interval $T_G$ results in a desaturated hue. The upper curves of FIG. 4b illustrate the preferred composition of the brightness signal B. The chrominance amplitude is biased to reach beam cutoff at the ends of the arrest interval $T_G$ as shown by signal I (a maximum brightness saturated green), and by signal 2 (a lower intensity but still saturated green) wherein C changes but S bias does not. In signal 3, illustrating a partially saturated high intensity green, the signal is biased further on to expose R and B. This S bias level signal and the C to Y composition are chosen to match the color transition requirements in shifting to complementary and to desaturated colors in a manner similar to that illustrated in the calculation of error curves of FIG. 2a. The function is also dependent, among other factors, on beam width, and a specific application may require a degree of error correction as described with reference to FIG. 3c.

FIG. 5 shows novel DCS and APC circuits for a display which employs a screen shown in FIG. 5a having horizontal phosphor stripes 38-15 in the pattern sequence RGBGRGB etc., an index pattern having two stripes 38-35a and 38-35b per triad, each having a different wavelength of UV emission in response to beam impingement thereon and a single aperture CRT in which the beam is preferably moderately elongated horizontally, the screen and beam being detailed in FIG. 5a. In this configuration, the principal corrections are vertical geometry and FM. (Correction generator 25 (FIG. 1) may employ elements more rudimentary or as more commonly used in conventional TV, since beam correction blocks 26 and 33 are not essential.) Television sync circuits 12 may also be of substantially conventional form. The basic reason for these differences is that a horizontal triad system does not have the resolution advantage which is obtained using beam arrest in a vertical system.

The input signals to the circuit of FIG. 5 are index signals UV1 and UV2, video M. raster drive HD and VD which were described with respect to FIG. 1, and color control signals CR, HV and SV which were described with respect to FIG. 2c. The output is minor deflection drive signal DD which accomplishes dynamic color separation in a manner to be described in connection with FIGS. 5a–c.

Sine wave signal CR, of constant (and adjusted to) unit amplitude, is .input to an inverter 21-52 and one side of double pole switch 21-53, the other side of which connects to the output of inverter 21-52. The switch is actuated by divider 22-54 when triggered by pulse HD thereby switching the phase (by 180° at H line rate) of signal CR at the switch output which is connected to an input of multiplier 23051. Saturation signal SV connects to the other input of 23-51. The multiplier is configured to perform the multiplication CR (1−SV) to generate an output sine wave having saturation amplitude equivalent to 1−S. Thus, as examples, when S=0, the output is 1; when S=1, the output is zero; and when S=0.5, the output is 0.5. This signal designated 1−S* is summed at the input of drive amplifier 23.52. Hue input signal HV is fed to inverter 21-54 and switch 21-55 in a manner as described for signal CR to provide ±HV switched at field rate by signal VD connected to +2 circuit 22-55; this output also summed at the input of 23-52 provides DCS signal CS at its output which is summed at the input of drive amplifier 23-56 together with the output of APC circuit 24-58, a hue adjustment 23-05 and any desired correction such as has been described, all contributing to provide DCS output DD from 23-56.

FIG. 5a shows a sequence of color triads 38-15 and index stripes 38-35 in a break-away view with UV1 on red and UV2 on blue. UV1 and UV2 are wider alternate examples shown to match a narrower beam for APC control to be described. FIG. 5b shows a sequence of color separation waveforms each progressing along a color triad at line scan rate and each taken at maximum amplitude which corresponds to a value S=0. The upper trace, at position 1 is presumed to be the first full line of the raster scan and scans all three phosphors of triad 1 of the screen format. The lower trace, at position 2, because of interlace, scans the third triad. In order that the scan at positions 1 and 2 have the same phase as shown, it is necessary to provide a 180° phase reversal at the end of each line and this is the purpose of switch 21-53. The middle trace, at position 3, is the 264th line in sequence and the first full line of the interleaved raster. It falls on the second triad and continuation, thus, produces a complete raster of dot interleaving (as shown by the instantaneous beam positions centered on each color stripe) color separation waveforms. It will also be apparent that the direction of the color pattern is reversed on the interlaced scan and it is a function of switch 22-55 to reverse the polarity of hue selection signal HV on alternate scans to correspond to the screen pattern. It may be noted at this point that horizontal DCS systems using the sine or other waveforms described herein and the usual RGBRGB non-alternating triad pattern (therefor not requiring switching) may be implemented substantially as described for FIG. 5. The alternating pattern is described because it allows a 50% larger beam size without substantial loss in color resolution and beam size loss in the horizontal configuration, which is otherwise a principal disadvantage to its use.

Analysis of the above example from FIG. 5b shows that the center of the beam is on R and B each for 120° of each cycle and spends 60° in closing green in each direction so the energy to each stripe is the same per cycle. Signal M, therefore, will produce B/W output. The effective dot interlace frequency is twice chrominance frequency, making B/W resolution substantially the same as was used in the embodiment of FIG. 4.

FIG. 5b shows reproduction of a saturated primary at position 4 for which $1-S^*=0$. The beam is centered on one stripe as selected by hue signal voltage—green being shown for example—and the arrows show hue shift range. In FIG. 5b, at position 5, saturation of 50% is shown. The beam scans from the boundary of red t the boundary of blue, and 50% saturation is produced for a beam width equal to the stripe width. The corrections for beam w of FIG. 2 are also applicable here. FIG. 5b at position 6 shows reproduction of a complementary color in which S also is 50%. The beam scans, for example, G and R equally as determined by hue shift HV, thereby producing a true complementary but, as has been taught, intermediate hues—which are subject to error due to beam width—are correctable.

The radiations from UV1 and UV2 of screen 38-05 (FIG. 5a) are distinguished by detector filters and/or by matching the sensitivities of photodetectors 28-51 and 28-52 (FIG. 5) thereto. Each is responsive only to its respective source, thereby producing index signals i1 and i2 which are amplified by 27-51 and 27-52 to suitable equal levels and connected to multiplicand inputs of divider 24-51. Index signal voltage level depends on the position of the beam relative to its index stripe UV1a or UV2a, but it derives from and is also proportional to beam current as controlled by video signal M which is connected as the divisor input of 24-51. Result of the division is an output signal IP which may be designed to have a unit level substantially independent of beam energy but which contains information relative to actual beam position.

To provide an explanation of the APC signal processing involved, a simplified example will be given. It will assume the uniform profile beam of unit width shown in FIG. 2c having unit current. When this beam is centered on a green phosphor as shown in FIG. 5a, it contacts neither of the index stripes, and i1 and i2, therefore, are both zero. As the beam moves onto UV1, i1 increases linearly, reaching a maximum unit value when the beam is centered on red. During this interval, i2 is zero. Now, if the beam is moved from green to red, i2 increases to unity and i1 remains zero. These are the signal changes which provide APC information as to the beam's position on the triad. The index signal processor 24-51 is chosen to have a configuration to provide a signal shown in FIG. 5c at position 1 directly indicative of this change, which signal should then correspond to the DCS signal induced beam movement as shown by the examples of FIG. 5b. Signal I2 is applied to a "plus" multiplicand input and signal I1 to a "negative" input of divider 24-51. The circuit has a+ gain after normalizing for M, its divisor input, and has a++ offset which occurs when I1 and I2 are zero. Its output IP is shown at position 1 of FIG. 5c. When the beam is centered on red, IP is zero, on green it is ++ and on blue it is +1. This is set up exactly opposite to the color separation output signal CS of summing amplifier 23-52 which is shown at position 2 of FIG. 5c, and the signals are shown to reverse over the triad range of FIG. 5a.

Signals IP and CS are mixed at the input to summing amplifier 24-52. As described above, the signals are set up to be equal and opposite resulting in zero output from SA2. But this set-up condition requires the beam to be in the position as described. If there is error in beam position compared to that prescribed by DCS control signal CS, the output will be position error $\pm\Delta E$ which is sent through polarity reversing switch comprising inverter 24-53 and switch 24-54 operated from VD as previously described for HV to provide an error signal of consistent error sensing direction. This signal is fed to APC error circuit 24-55 whose function is to integrate or accumulate and amplify successive errors. The output is connected through summing driver 23-56 to the minor deflection plates 35 where it drives the beam with optimum response in well known manner in a direction to cancel the errors. The DCS output signal CS is also summed at the input of driver 23-56 and thereby the CS signal is also coupled to plates 35 to perform color separation as described with respect to FIG. 5b.

In practical application, beam width will not be idealized as described. UV1 and UV2 of FIG. 5a show alternative widened index patterns, the width being chosen to match the beam so as to obtain a substantially linear position sensing signal shown at position 1 in FIG. 5c for either example. Alternatively, linearity response error may be corrected as required to match the system parameters used by methods which have been described herein for other such errors, or the index pattern may be altered to match a desired response and an example of this will be described.

As a consequence of the reversing triad pattern used in this display, any waveform such as the sine wave described which will provide dynamic color separation in the region from red through green and blue (positions 1 through 6 of FIG. 5b), cannot provide the hue shades of the complementary color magenta requiring red and blue. Accordingly, although not critical, these hues must be generated by other means. This is accomplished in the display of FIG. 5, for example, by very rapidly switching the beam from the blue to the red stripe whenever the color separation waveform causes beam deflection to go beyond the center line of the blue stripe (position 2 of FIG. 5a). The action is reversed in the direction of red. This is accomplished by voltage comparators 23-54 and 23-55 which receive output voltage CS at their negative inputs. The positive input of comparator 23-55 is preset to a voltage level v1 which is equal to voltage CS when it corresponds to beam position 2 of FIG. 5a when centered on blue. When CS goes more positive than v1, the output of 23-55 switches from a positive to a negative limiting voltage and this voltage is coupled to the summing input of drive amplifier 23-56 with a gain value which causes the beam to jump from blue position (2) to red position (3). The positive input of 23-54 is similarly connected to v2 level corresponding to red and when CS goes more negative than v2, the beam jumps to blue. This circuit maintains color separation across the RB color region.

Figure 6:
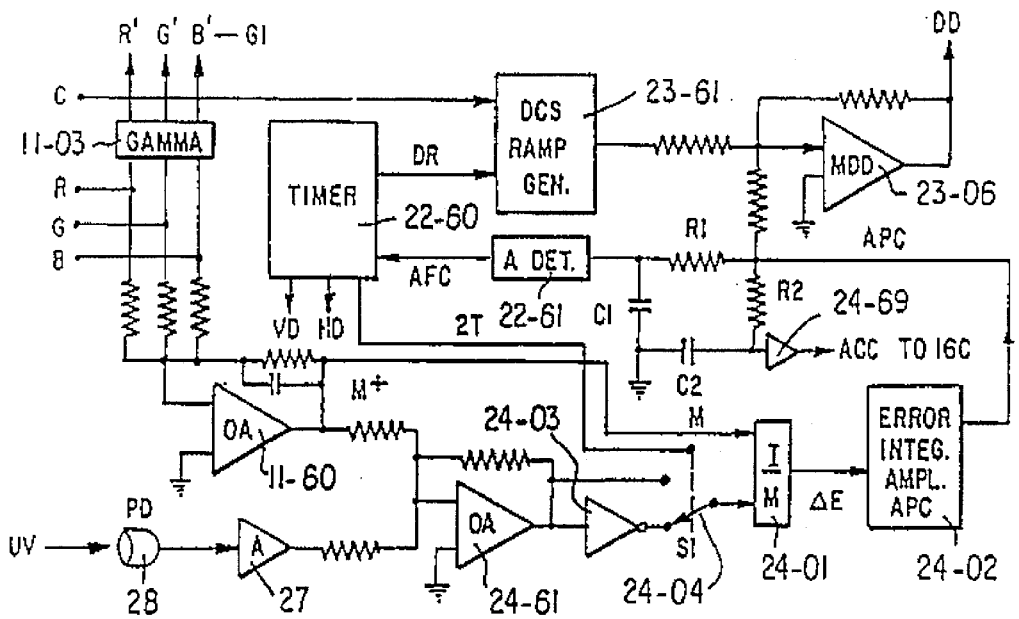
FIG. 6 is a circuit diagram of a three (3) beam, vertical stripe, dynamic color separation CRT display.

FIG. 6 is a block diagram of the DCS and APC circuits of display 20-6 which uses CRT 31-03 with vertical stripe triads 38-1 and three beam gun 32-03. The beams are modulated by R, B, G video from signal processor 11 and are fully arrested at each triad, each beam landing on its respective color phosphor to reproduce its primary color component of the display output. To this end, the general display features and variety of applicable correction requirements have been described with respect to FIGS. 1, 2 and 3. One index signal is generated from index pattern 38-33 of FIG. 2e which has edges centered on each color stripe and acts to correct the positions of the beams to center on the stripes. The pattern reverses on alternate triads thereby providing bi-directional balanced APC action and providing means to identify triads to which the beams must be positioned rather than just individual stripes.

Timer block 22-60 provides the functions and signals described with respect to timer 22-00 of FIG. 2b which are necessary to the operation of the circuit of FIG. 6. Color separation requires use of the triad zero time drive reference pulse DR which is an input to and controls the timing of ramp generator 23-61 to generate output RR (FIG. 2e, reference ramp generator 23-01) which is herein modulated by Δc input to maintain beam arrest over the format area thereby providing the DCS function. The signal RR and the output APC of automatic position control circuit 24-02 are summed in drive amplifier 23-06 to provide minor deflection drive signal DD, the DCS output to plates 35.

Video signals R, G and B are shown connecting to G1R, G1G and G1B. They are also summed in signal processor amplifier 11-60 whose output $M^*$ corresponds to brightness signal M. It is to be noted that the processing occurs before application of gamma correction 11-03 to the grid signals. Index UV detected by photodiode 28, amplified by 27 provides positive index signal I as previously described. I and $M^*$ are of opposite polarity and are adjusted to have equal response and amplitudes when the beams are centered on the index pattern edges. Signal linearities are adjusted so that this relation will hold at all signal levels. The signals are summed in amplifier 24-61 whose output will, therefore, be zero under the conditions described. However, if the beams move off the centers of the stripes, an error signal will be generated which reverses polarity on alternate triads due to index pattern reversal. This signal provides APC action and as described with respect to FIG. 5, such signal is proportional to beam current which herein is $M^*$ so the signal may be designated $\pm \Delta E M^*$. It is connected to one pole of switch 24-04 and to the input of inverter 24-03 whose output connects to the other pole of switch 24-04. Signal 2T from timer 22-60 actuates the switch to provide a unidirectional output signal connecting to the multiplicand input to divider 24-01. Signal $M^*$ is connected to the divisor input thereby providing an output unit signal ΔE substantially devoid of brightness variation, but whose amplitude and polarity is a measure of beam position error. Signal ΔE is applied to APC circuit 24-02 which accumulates the error and applies its output to reposition the beam via driver 23-06 to cancel the error.

The APC signal is used in FIG. 6 to provide two additional correction functions. These functions are generally applicable to the automatic position signal of other versions herein in the same manner as to be described, but will only be specifically shown once. The APC output signal is applied to a filter shown symbolically as R1/C1 which extracts and passes the H line frequency error component to amplitude detector/amplifier 22-61 (the control equivalent of 22-01, FIG. 2b) whose output provides an automatic frequency voltage control signal AFC to lock master oscillator frequency of the timer to match triad frequency as described in FIG. 2b.

The APC signal, as previously described, is capacitively coupled to the minor deflection plates where it makes high speed response correction to beam position. Low pass filter R2/C2 is designed to pass the APC low frequency error content through amplifier 24-66 to provide an automatic centering control signal ACC which is connected to the centering control input of X deflection amplifier 16 (FIG. 1) where it corrects any X circuit drifts, thereby to maintain centering of the line scan.

Figure 6A:
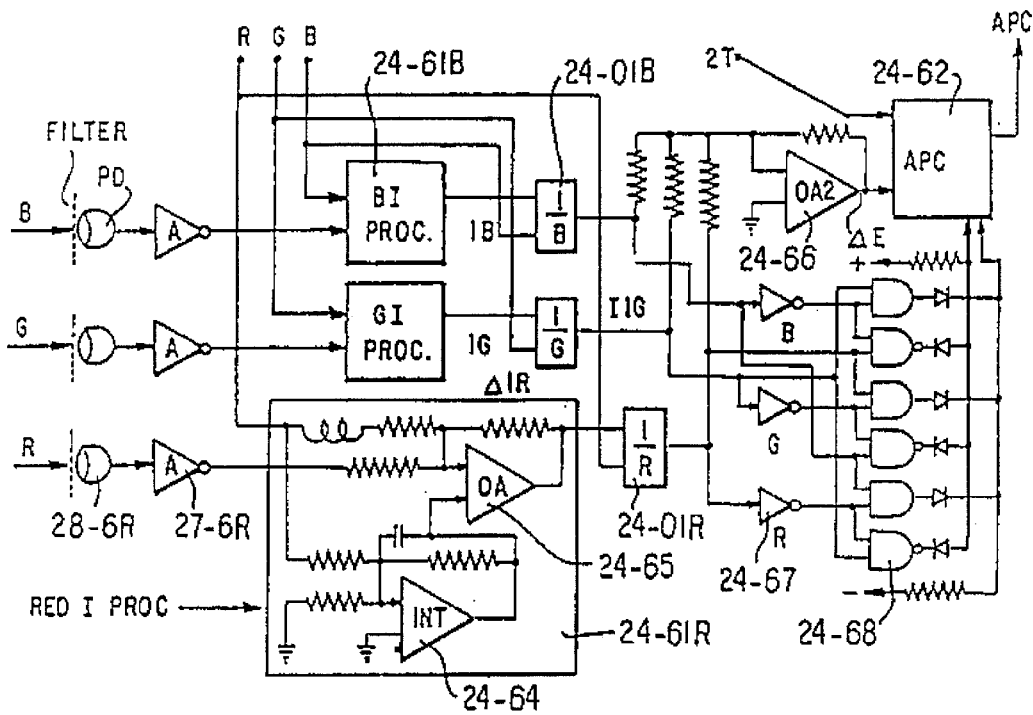
FIG. 6a shows an alternate method of generating the index signal directly from the R, G, B display output illustrated at FIG. 6b.

In FIG. 6a, there is shown a circuit variation for index signal generation which is particularly suitable for use in projection systems or other displays whose RGB luminous output components are readily available to detector devices. The circuit is an alternative to the portion of FIG. 6 which generates the ΔE error signal the CRT screen has no separate index pattern. Instead, R, G and B output is received by photodetectors 28-6R, 28-6G and 28-6B. Each detector is made to respond only to its color component by selective filtering of its input and/or by the selectivity of a detector itself. After amplification by inverting amplifiers 27 R, G and B, the signals are fed to respective R, G and B index signal processor/detectors 24-6R, 24-6G and 24-6B which do the error extraction similar to 24-61 of FIG. 5. But they also remove background signals. Direct use of the index signals would result in false background signals coming from unwanted regions of the CRT. This is because each phosphor has a relatively long decay time characteristic so, for example, there may be substantial amounts of red illumination from other than the instantaneous position of the red beam; but the latter is the only position to be corrected—therefore, the only one which should supply a signal. Separation of this instantaneous signal from prior background is achieved by video signal processing. It is basically the same for each channel, and circuit details for the red channel will be described. Red video feeds into an integrator circuit 24-64 designed to match the response of the red phosphor. It integrates the total video signal content over time, but this total is bled back toward zero by the decay time constant (TC) of the integrator which is made to match the decay characteristic of the phosphor. The integrator output, therefore, always has a negative magnitude proportional to the total background light being emitted by the red phosphor. It is fed into the positive input of a second adder/integrator 24-65. This integrator responds at much faster speed than the first. Its function is to measure the error current during each triad interval T (nanoseconds) whereas a phosphor decay may be in milliseconds. The index signal, also having a negative background level and a negative instantaneous signal component proportional to instantaneous red video is fed into the negative input of 24-65. Circuit gains are adjusted so the two background levels are the same, resulting in zero background level output but in a negative index signal representative of instantaneous beam position. A component of R video is delayed equal to the response delay of the indexing signal output and it also is fed to the summing input of 24-65. Its magnitude is chose to equal the red index signal when the beam is centered on red. The resultant output is again zero unless the beam moves off center.

The output from each processor is a signal which increases from zero as its beam moves off stripe center in either direction. These signals are proportional to their beam currents. Each processor output is therefor summed in OA2 (24-66) after division by its video in divider 24-O1R, G, B (all as has been described with respect to FIG. 6) to provide output signal ΔEa whose magnitude is only dependent on departure of the beams from the centers of their respective phosphor strips at each pixel.

Figure 6B:

Because in this embodiment the error shift is unidirectional, the +2 output 2T is fed to the APC circuit 24-62 where it reverses error sensing direction each cycle to compare and balance the error signal over two cycles. In order to provide direct error sensing for FIG. 6a, it is necessary to provide a screen in which each stripe is separated by what is referred to as a guard band 1 shown at FIG. 6b. The purpose herein is not to guard the beam, but to provide edges by which its position may be readily detected. The color strips are therefor made just wider than average beam width, the optimum being so that electrons only from the wide skirts are blocked out (see FIG. 2c, beam w). Then a shift from either direction rapidly changes signal strength, the signals being highly non-linear.

As described thus far, FIG. 6a cannot detect well whether its beams are on the correct colors. Any beam will excite either phosphor But if the "on" beam is wrong, it and its adjacent channels will put out large false signals and these are used to abruptly shift the beams to their correct location. This is accomplished by inverters 24-67 and the net of AND/NAND gates 24-68 in conjunction with output diodes providing a plus and minus input to APC 24-62. An error sends a right or left shifting pulse to the apc circuit which moves the beams one stripe to the correct position. The action is similar whether arising from any one channel or all three.

FIG. 7 is a block diagram and illustrations showing operation of a color display embodiment disclosing a unique method of dynamic color separation and a preferred APC circuit. This display uses vertical triads and a CRT gun having three multi-aperture beams similar to that shown in FIG. 6, but in this example, gun 32-02 is used wherein all apertures are controlled by one grid 32-22, and the video input to this grid G1 is brightness signal M'. Whereas the embodiment of FIG. 6 has an equivalent brightness three times larger than the one beam versions, this embodiment provides an additional increase by a factor of three for saturated colors. The DCS action is provided by the linear ramp waveform SR of FIG. 2e which is only partially amplitude modulated by saturation signal SV, primarily causing beam arrest as in FIG. 6, and the arrest is time controlled by hue phase drive pulse Di. In this embodiment, DCS is also enabled by convergence modulation of the R and B beams. Reference is made to FIG. 3d showing normal unmodulated location of the three focused beam groups, each to its color on a pixel at .the center of the CRT screen. The actions have been described (ref. FIGS. 1–3) for focus modulation and the full complement of distortion corrections, which must be provided to maintain this pattern relationship throughout raster scan of the screen format.

Referring to FIG. 7, a ramp generator 23-71 has inputs V (modulated by Δc) and hue timing Di and it generates output CS which has been described by examples 23-01 and 23-10 (FIG. 2d) for the RR and SR graphs of FIG. 2e. Signal CS is connected to the input of drive amplifier 23-06 also having APC and hue adjustment (23-05, examples previously shown) inputs and whose output DD is connected to the beam minor deflection plates 35 of CRT 30 having gun assembly 32-02 where they provide beam arrest which, in this display example due to control by Di timing, occurs at the beam position on the triad corresponding to dominant hue i. This action will be illustrated by diagrams of FIG. 7c. Saturation signal SV is also provided to drive amplifier 26-6 whose output connects to deflection plates 33-10 or 33-10a which control convergence of the three beams. This action shown in FIG. 7c provides color saturation control thereby completing dynamic color separation. Signal M is fed to gamma correction circuit 11-01 which converts M to non-linearized signal M' which is connected to CRT G1 to control beam current in a well known manner, thereby providing display brightness output.

FIG. 7c illustrates the color separation action of this display. FIG. 7c, at position 1, shows the three beams arrested on a color triad in normal positions where each is striking it own phosphor when the convergence control signal input SV is zero. Equal values of primary colors produce white output. FIG. 7c, position 2, shows the three beams converged onto one phosphor (G) when SV signal is a maximum (e.g., a value of one) corresponding to a saturated primary hue. FIG. 7c, positions 3 and 4, shows the beams converged 50% which corresponds to 50% saturation signal amplitude.

With reference to FIG. 7c, position 2, it will be noted first that the amplitude of ramp signal CS is a maximum and is adjusted to arrest the three beams on green during the time interval T of crossing one triad to thereby produce a saturated green output. Second, the beam at phase i=zero may be shifted plus or minus in time so the beams land at any other hue in conformance with chrominance C shift. In FIG. 7c, position 3, phase i has shifted to the complementary color cyan comprising equal parts of G and B, and the center beam is centered on the boundary of these two color stripes. However, at a complementary color, NTSC decrees that saturation S shifts to 50%. Therefore, the outside beams go to 50% convergence, one landing on B and one on G as shown. For preliminary explanation purposes, it will be assumed that signal SV is no connected to the ramp generator 23-50 so that the beams are fully arrested throughout each triad interval in the positions as shown. FIG. 7c, position 3, then produces a fully saturated complementary (cyan) output having exactly equal parts B and G. Similarly, FIG. 7c, position 1, illustrates equal parts of R, B and G to producer a white output. In FIG. 7c, position 4, the beams are 50% converged and centered on G. This corresponds to a 50% saturated primary green comprising one half saturated green and one half white which converts to ⅔ G, ⅙ B and ⅙ R.

Thus, the DCS system demonstrates true color separation at 13 major points of the color spectrum which are not critical to beam width. As shown in FIG. 2a, however, but to a lesser extent, there will be errors (maximum at hue intermediate to primary and complementary colors corresponding to the 30° phase shift position) which are dependent on beam width and profile. In the above examples, perfect separation at all points is achieved only with the uniform profile, unit width beam of FIG. 2c which is impractical. This problem can be essentially eliminated in this embodiment by applying a component of SV to the arrest ramp output signal of generator 23-71 so that a narrow beam may not be arrested as fully as shown in the above example, thereby having an equivalently greater and more uniform width. Accordingly, as optimum combination of the convergence and beam arrest magnitudes may be provided to match a specified beam width and profile, this embodiment thereby providing a high performance and non-critical color separation function. It will be described as a preferred embodiment for the ASPC circuit of FIG. 7a which uses time pulse processing to detect correct hue position. The DCS of FIG. 7 may, however, be adapted to use a variety of APC circuit configurations (such as described for FIGS. 8 and 9) generally shown by block 24-70 in FIG. 7.

The UV input to photodetector 28 of FIG. 7 generates signal i which is amplified by OA 27 and divided by video M in analog divider 24-01 to provide an index signal substantially devoid of brightness content, but which conveys position information at a "unitized" level. This provides a basic index signal which functions over the format scanned area and which is input to APC circuit block 24-70. In generalized form, time control TC signal and hue/saturation HS signal information is required to provide generation of an output APC signal. Besides direct high speed position control the output may provide frequency control and scan centering control. In most of the figures herein, APC is shown going to the minor deflection plates 25 which are only AC coupled. In such arrangements, the description is concerned with the immediate triad position response and a DC coupled path to frequency or centering control for low frequency drift, etc. is presumed.

The DCS circuit of FIG. 7 may be used with zero time reference pule DR replacing Di in which case hue shift will be obtained by adding HV to the input of summing amplifier 23-06 as in other embodiments. As alternate examples, the APC may be that as described in FIG. 8 in which case the complete APC/index circuit of FIG. 8 is used. Or, the APC may be that as to be described in FIGS. 7b, 8b and 9b with the circuits and index pattern of FIGS. 8a and 9a. In the use of FIG. 7b, the acquisition pulse AP may be pulse RT or a time widened version of the same because, for FIG. 7, hue position is held substantially over the full triad time T.

FIG. 7a is a block diagram for a time pulse controlled version of APC, block 24-70 and FIG. 7b is a plot of its operating waveforms in relation to screen section 38 having triad pattern 38-1 and index pattern 38-34 (see FIG. 2e). In this embodiment, the hue saturation HS control input is the saturation signal SV' which has been non-linearized to match the desired output. The time control inputs are clock CK and Ti pulse which, of course, also contains HS hue position information and is shown, by way of example, centered on green at zero phase. The Ti and CK signals are supplied to a flip-flop 21-21 which generates the i/3 pulse which was described with respect to FIGS. 2d and 2e, the i/3 pulse having a width herein proportional to hue shift i over one color stripe. The timing of these waveforms and the frequency dividers 22-73 and 22-74 having respective output 2T and 4T as used in the circuit of FIG. 7a are shown in FIG. 7b in relation to the beam arrest ramp RR of FIG. 7 as well as to the index pattern.

FIG. 7b shows a plot of index signal I1 as would occur for uniform scan of a beam across the index pattern at constant beam current. The signal only provides useful position information at transitions across the edge of the index pattern. The beams herein do not scan. They are arrested at dominant hue position each cycle. For the example (green) herein, dots at positions 1, 2, 3 and 4 show the index signal values. Positions 1 and 2 have the green hue information, but the direction at 2 is inverse to that at 1. The signal at 3 is zero and at 4 it is 1 and neither of these will change with hue shift over its green stripe. The circuit of FIG. 7a selects those index positions (1 and 2 of the example) which show beam position. Their index signals are compared to the i/3 pulse hue information in an APC detector to extract the beam position error signal comparable to ΔE. But, in this case, the signals are timed pulses of current generated by Q1 and Q2 and integrated by capacitor C1 to provide an APC signal at the output of amplifier 24-76.

With reference to FIG. 7a, the negative edge of Ti triggers FF 21-21 and it is triggered back by the next negative clock transition to generate the i/3 pulse having a width proportional to hue phase i in relation to its color stripe. The inverse of i/3 is connected to the base of Q3. When the inverse of i/3 is high (positive), the emitter of Q2 is driven more negative than its base and its collector, therefore, can draw no current. When i/3 pulses negative, Q2 generates repetitive current pulses $i_1$ proportional to hue phase and they charge C1 positive. Ti also triggers divider circuit 22-73. When its output (2T) is positive, corresponding to index positions 3 and 4, it holds Q1 emitter more positive than Q1 base so there is no collector current. Index signal I1 is applied via inverter 24-03 and switch 24-04, as has previously been described to provide a unidirectional index signal containing beam position information which is applied to the base of Q1. Switch S1 is controlled by 22-74 at the rate of 4T to correspond to index pattern reversal and Ti shifts timing intervals to correspond to index transitions. Transistor Q1 turns on during the negative T intervals of 22-73 corresponding to I1 at positions 1 and 2 and generates pulses $i_2$ proportional to I1 and they discharge C1. The circuit is adjusted such that $i_1$ balances $i_2$ when beam position error vs. hue is zero establishing a reference voltage level on C1 which is applied to a very high impedance input of 24-76 whose output as previously described, drives circuitry which corrects any beam error thereby to maintain the reference level.

The above description has assumed a full saturation beam at a primary color. As hue shifts the beams to the edge of an index stripe or as it is spread by reduced saturation level, the index signal is reduced. In order to compensate for this index signal's non-linear dependence on hue and saturation, these signals (SV & inverse $_wc$ obtained from i/3 through filter 21-22) are applied to modulator 21-73 which generates an output signal applied via R1 to modulate $i_1$ to match the index variations.

The embodiment of FIG. 8 is a single beam DCS display using the CRT gun 32-01 and vertical screen triads 38-10. The DCS wave form is signal SR from saturation modulated ramp generator 23-10 which was described with respect to FIGS. 2d and 2e. The discussion of errors with respect to FIG. 2a and the methods for their correction described in FIGS. 2d and 2e are directly applicable to waveform SR. The gun herein, having a substantially elongated beam to fit the pixel and, therefore, providing higher brightness and resolution, also requires the scan corrections and beam controls of the overall system as previously described with respect to FIGS. 1 and 3. The method of color separation using waveform SR has been described in detail in the prior art, but the error deficiencies have been generally ignored.

The circuit of FIG. 8 provides a complete working system having all the corrections necessary to obtain satisfactory color output. This DCS is then combined with a unique CRT indexing pattern (FIG. 8a) and automatic position control (waveforms FIG. 8b) which corrects substantially the hue position of the beam thereby to eliminate hue shift as a dominant error as has occurred in prior art disclosures.

FIG. 8 shows the interconnections of a number of functions required and previously described for performing DCS and APC. Thus, signals C (which is assumed to have been converted to match color triad period T) and Y are provided to divider 21-01 to generate signal S which, at the output of 21-02 detector/filter, becomes SV and is used to modulate the output ramp SR of ramp generator 23-10. Reference pulse DR is an input to ramp generator 23-10 and controls the ramp timing. Signals FR and F$_\Theta$ trigger MV 21-06 to generate T$_\Theta$ which becomes hue control signal HV when filtered in low pass filter 21-07. Detection of UV screen radiation by photodetector 28 produces index signal i which is amplified and inverted by 27 and becomes −Im, the input to divider 24-01. A unit index signal I1 whose polarity is inverted on alternate triads due to reversal of the index pattern is produced by dividing I by brightness signal M. The inverting index signal is connected to switch 24-04 and inverter 24-03. The switch is actuated by +2 circuit 22-13 which is triggered by pulse DR alternating at ½ the triad rate to provide a unidirectional index signal I1 which provides one input to APC circuit 24-02. The APC output, HV, hue correction $_wc$, SR correction and a hue adjustment voltage 23-05 are summed at the input of drive amplifier (OA1) 23-06 and provide the DCS output control waveform DD coupled to plates 35 of CRT assembly 30-8 having all features as described herein.

The above are elements and circuit block functions previously described either in preliminary system descriptions or as elements of prior embodiments which are herein tied together to show the complete control circuit detail of a specific DCS/APC color display. The APC system action is more fully described in connection with the diagrams of FIGS. 8a and 8b. FIG. 8a illustrates a small section of screen having two color triads 38-1 and an index pattern 38-38 on the rear side. The index pattern is uniquely constructed in that it is not a solid stripe and instead provides an index signal which varies spatially across the triad. This may be obtained, for example, by changing area density of a UV phosphor such as by elemental area design or by use of a variable density screening pattern, a technique well understood in the printing industry. The result is illustrated in FIG. 8a by use of a variable height pattern to represent the variable density pattern. The density of the pattern is controlled to provide an index signal amplitude, resulting from scan of a constant current beam of prescribed width and distribution across a triad, which corresponds to the hue signal HV amplitude, which is the signal used to cause beam scan across the triad in selecting dominant hue to be produced. Thus, index signal voltage i becomes directly proportional to HV and is an instantaneous measure of beam position on each pixel. The pattern 38-38 is made to change direction on alternate triads as shown.

Behavior of the index signal corresponding to color separation action of an approximately 50% saturation signal SR in being shifted from R (waveform b1) to B (waveform b2) by hue signal HV is shown in FIG. 8b. At position plot b1, corresponding to ramp SR, the beam moves from a B stripe (dotted) to the R stripe, thence to the G stripe (shown solid). The corresponding index signal i after normalization to become I1 (shown solid) is always positive because it is a function of the pattern of FIG. 8a, starts at the left with amplitude shown at b1a, decreases to zero at the BR border, and then goes positive again, its plot coinciding with SR as shown. At plot b2, centered on B due to hue shift, the index signal follows SR (and HV amplitude) until it gets to the BR boarder from which it decreases reaching a final value at b2a corresponding to beam movement b2 (again dotted) onto R. At intermediate color values, reversal of the index signal disappears, it being in all cases determined by the beam crossing a triad border which in the discussions here has been chosen as the R-B border. FIG. 8b also shows the beam movement across the triads due to the composite action of output signal DD and the major line scan deflection X. The line scan is the straight line C1 shown centered on green hue resulting when ramp SR has zero amplitude and producing monochrome output, hence the M vector. Ramp waveform C2 illustrates low saturation green producing composite DCS, the waveform corresponding directly to index signal I1, shown at d1 below just as it did for the coincident portions of waveforms b1 and b2. However, at C3 (one triad earlier) I1 waveform d1 slope is reversed. The complete waveform corresponding to scan C2-C3 for I1 is shown at d1. After i has been amplified, M variation removed and reversal action of S1 applied as described, the signal becomes −I1 shown at d12. Signal −I1 is an inverse duplicate of beam control action within each triad cycle, and it operates for any version of beam controlled color separation waveform. It may, therefore, be compared to a voltage simulation of composite beam motion, the comparison showing any error in actual beam position.

Horizontal line scan is a major component of each triad scan and, in order to provide a waveform corresponding to composite scan for comparison to the index signal, a composite simulated waveform is generated. To do so in the circuit shown in FIG. 8, a constant amplitude negative ramp generator 23-81 (see 23-01 of FIG. 2d) driven by triad time pulse DR and generating output −RR is provided. Signals SR, HV and −RR are added at the input of summing Op Amp 24-81 to provide simulated deflection waveform SD at its output. Except for departures at b1a (FIG. 8a) and b2a, it matches the index signal and is made equal and opposite thereto for zero beam position error. SD and −I1 when summed at the input of APC error control circuit result in a zero output signal. If, however, the beam goes in error towards red, a plus error signal (for example) rapidly develops and a negative signal develops for beam error toward blue. As in the prior description, APC acts to deflect the beam to reduce this error to zero. The system, having bipolar error detection, reduces the error between alternate cycles to a balance point so the system does not depend on absolute values of its operating parameters—for example, gain balance error or changes due to non-removal of M are balanced over two cycles whereas a position error becomes doubled by APC error summation until it is removed by beam shift.

The index reversals noted above at FIG. 8b at b1a and b2a are simulated by the circuits comprising differential input amplifiers A3 24-82 and A4 24-83. The positive input of OA3 connects to a voltage corresponding to the B-R boundary at plot b1a of FIG. 8b, and the positive input of A4 connects to a voltage corresponding to B-R at plot b2a of FIG. 8b, both levels being in reference to the simulated deflection SD voltage levels of 24-81. The negative inputs of above OA's are connected to SD signal. The A3 and A4 outputs connect through diodes to resistors R1 and R2. Whenever SD goes beyond +V level, the output of A3, which has been at a plus limit, quickly goes negative engaging its diode to R1 and R2. This action by feeding back through R1 to the input of A2 transfers its signal to A3. The signal component shown at FIG. 8b, plot f1 in relation to triad timing is connected via R2 to be summed at 24-02 input and matches the index boundary reversal component of plot b2a of FIG. 8b. In similar manner, when SD goes negative, A4 activates to generate the component f2 matching plot b1a of FIG. 8b. the latter corresponding output SD is shown by plot e1 wherein component e2 is zero. In similar manner, when SD goes negative, A4 activates to generate the component f2 matching plot b1a of FIG. 8b.

There are several index circuit variations which may be made based on other basic concepts of operation and other index patterns but which, as described above, use the input color separation signal information to generate a beam error signal ΔE. The embodiments of FIG. 8 and FIG. 9 to follow are similar except for their difference in color separation waveform. Index variations will be described for both after the description of operation of FIG. 9. Both FIGS. 8 and 9 use a deflection simulator for comparison to the index signal. For this purpose, all the signals should be based on fixed pixel parameters; but DD output should have Δc modulation to match scan deflection variations. In FIG. 8, this modulation is provided at the output driver 23-06 whose output is input to multiplier or modulator 23-07. Signal Δc is applied to the other input and it causes 23-07 to generate a Δc modulated component of DD which is fed back to the input of 23-06. The method is satisfactory for small modulation components.

Figure 9:
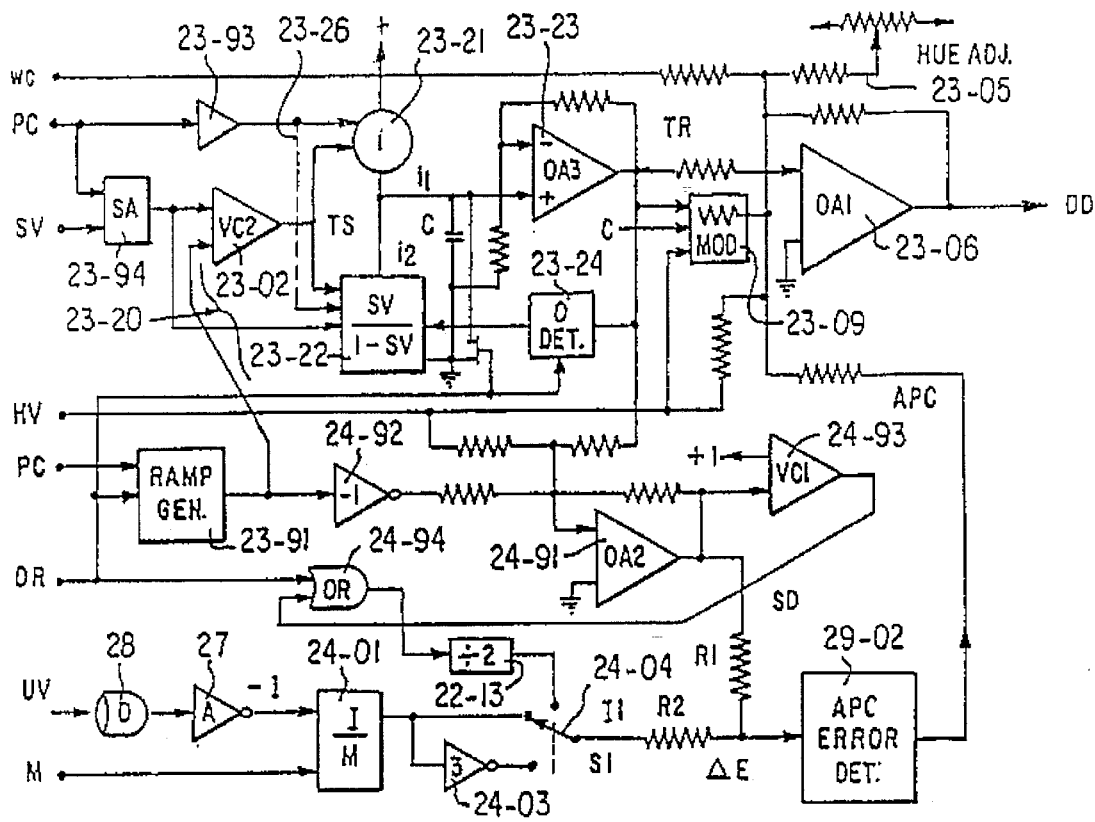
FIG. 9 is a circuit diagram of a display using a time modulated ramp waveform for dynamic color separation including corrections thereto and APC.

The DCS embodiment of FIG. 9 uses the DCS time modulated waveform TR described in FIGS. 2d and 2e. Its circuit blocks are 23-01 ramp generator, VC 23-02 and dual slope generator 23-20 providing output waveform TR. The resultant composite output D of FIG. 9 is shown relative to the associated waveforms in FIG. 9a. The circuit of FIG. 9 provides the complete diagram for DCS and APC functions.

Since the TR generator 23-20 has an unusual waveform requirement, an example illustrating its makeup will be shown. The system uses vertical triads and the single shaped beam gun 32-01 with video M' driving G1. Other system requirements are substantially those described with respect to FIG. 8. The saturation separation of waveform TR is not as critical s is SR. However, prior art has not recognized the discrepancy in separation requirements vs. NTSC behavior and this, as well as means for its correction, are described. Since the major function blocks have been previously described, their interconnection will be briefly reviewed.

The DR input signal synchronizes ramp generator 23-01 producing ramp RR, which with SV, corrected by PC, are inputs to VC 23-02. Its output TS is the timing signal applied to ramp generator 23-20, and it conveys the color saturation ratio of output signal TR. Signal TR, hue signal HV, hue correction $\Theta c$, and/or $_wc$, APC output and adj. 23-05 are summed in output driver 23-06 to provide the DCS output signal DD to deflection plates 35. UV from index pattern 38-3 into photodetector 28 fees amplifier 27 whose output and video M are the inputs to divider 24-01. Its output connects to a pole of S1 24-04 and to inverter 24-03 whose output connects to the other pole. S1 24-04 is activated by +2 22-13 to reverse the index signal to correspond to index pattern reversal thereby providing unit index signal I1 to the input of the APC block. The TR waveform generator and several variations of index/APC action will now be described.

Figure 9A:
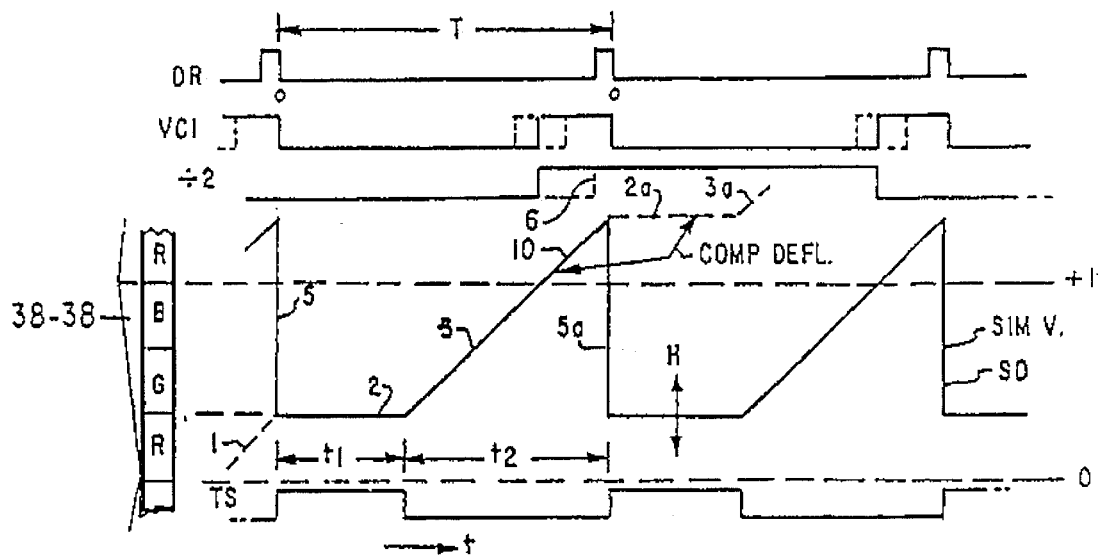
FIG. 9a shows the APC and DCS waveforms in relation to a screen section.

Circuit 23-20 ramp generation beings with a constant current generator 23-21. This current is amplitude modulated by a small percentage of SV to control the degree of beam arrest to compensate for beam width as previously described. The plus state of signal TS, which connects to a switching time control input, actuates the generator producing output $i_1$ which charges capacitor C to generate the rising slope of TR (ref. FIG. 2e, TR points 1–3). The corresponding composite deflection and simulated deflection output SD of 24-91 is shown in FIG. 9a having an arrest time $t_1$ and scan time $t_2$. When TS goes negative, its input to a second constant current generator 23-22 turns on current $i_2$ discharging capacitor C and thereby generating the negative slope of TR (FIG. 2e). Capacitor C provides a signal to the plus input of Op Amp OA3 -23-23 which is set up to provide predetermined signal amplitude and bias level. The bias level is critical and must not shift with timing, modulation, etc. The theoretical requirement is that $i_1 t_1 = i_2 t_2$ where the t's are the current "on" times and $t_2 = T - t_1$ or $t_2/T = 1 - t_1/T$. Therefore, $t_2/T = 1 - SV$ and $i_2/i_1 = SV/(1-SV)$ applies assuming modulation only by SV. Its correction by PC modulation will be described subsequently. For the present condition, generator 23-22 is shown as a divider having SV input and configured to perform the above division. However, there may be circuit instabilities, corrections are required and as described, the $i_1$ generator 23-21 has additional modulations applied. These changes can be adjusted by feedback means employing a zero level detector 23-24 which is activated by DR at the end of each cycle and controls the dividers unit level magnitude to conform to changes in $i_1$. It may also employ a switching element 23-25 such as a FET to short the capacitor to zero at the end of each cycle thereby removing residual error and it may provide the same modulation to $i_2$ as was provided to $i_1$. This is shown by dotted connection 23-26.

The NTSC signal does not conform, however, to the above theoretical color separation waveform disclosure of prior art. NTSC provides correct saturation values for primary hues, and the time modulated signal should be the same for all shades through complimentary colors. However, in NTSC saturation S goes to + at the complementary color positions resulting in a 50% desaturated color. This signal discrepancy is corrected by generating the PC signal which in FIG. 2e has previously been described. PC is used to amplitude modulate signal SV by applying both signals as inputs to summing amplifier 23-94 such that when SV has unit amplitude (at primary hue) then 23-94 output has unit amplitude (PC=0) and when SV goes to + amplitude caused by shift to a complementary color (PC=1), the corresponding voltage generated by 23-94 restores SV amplitude to unit amplitude, herein designated SV*. The result is that hue shifts do not change versus time ratio which is ten only a function of saturation, and complementary colors are able to provide full saturation output level. Implementation of the corrections described for this embodiment provides a display having true color fidelity and one which is not critical to and can be matched to beam parameters. A high performance set uses timer 22-9 to provide and lock in all the requisite time control signals of FIG. 2b required for the embodiment. Alternative to the divider described above, i2 generator 23-22 may be achieved by relying on high gain output from zero level detector 23-24 to provide the correct value of i2. TS, as before, serves to turn i2 on and off by any of well known means.

As described for FIG. 8, modulator 23-09 served to provide $\Delta c$ modulated output to DD. In this example, the inputs are $\Delta c$, hue HV and color separation TR signal.

Referring back now to the APC section details and their action, there is shown summing amplifier 24-91 which corresponds in function to 24-81 of FIG. 8. Its inputs are TR, HV and -RR. In this embodiment, since RR is generated as a positive ramp, it connects through inverter 24-92 to provide -RR to 24-91 whose output is SD—a voltage which simulates the composite beam deflection across each color triad as was described for FIG. 8. The SD output signal and -I1 are summed at the APC input leaving residual error signal $\Delta E$. SD also connects to an input of VC12 24-93 whose other input connects to a +1 voltage level corresponding to the blue-red triad boundary. The output of 24-93 connects to an input of OR circuit 24-94. Triad time pulse DR is also input to 24-94 whose output triggers +2 circuit 22-13.

DCS/APC circuit action is shown by FIG. 9a. Beam scan direction is shown by arrow v in relation to a screen triad 38 having transverse stripes 38-1 and the index pattern 38-38 as described for FIG. 8a and to corresponding composite deflection control voltage signal magnitude arrow V at right while arrow t shows time scale plotted left to right. Zero time reference pulse DR (FIG. 2b) is the top waveform. The composite motion of the beam across a triad in performing an arbitrary color separation cycle controlled by saturation time signal TS is shown in comparison to simulated separation deflection voltage SD and time control signal TS below. The waveform illustrates production of an appropriate 40% saturated yellow—the complementary color produced by hue HV positioning of the beam at the R-G stripe boundary during an arrest interval 2. The beam deflection is shown at position 1 (dotted) reaching the R-G border at time t=0. The plus slope of TR opposing line scan causes beam arrest during interval 2, producing yellow. The beam then moves linearly to the next R-G border comprising interval 3 to the triad B-R borer and interval 1a (corresponding to interval 1) to the R-G border where the cycle is repeated on the next triad as shown by 2a and 3a. During the constant velocity scan of intervals 1 and 3 on the triad, a white output, being equal amounts of R, G and B, is produced.

The simulated deflection SD corresponds exactly to the composite deflection just described except that at the end of each cycle at position 5, its waveform returns to the level 2 at the beginning of the cycle. This signal will be the same as produced by the index pattern 38-38 described in FIG. 8, except as therein, the index pattern and, therefore, the index signal reverses on alternate triads. In FIG. 9a, the index signal reaches its maximum positive unit value at the end of interval 3. In FIG. 9, switch 24-03 is actuated to cause reversal of signal I1 at the end of each triad with polarity chosen to produce −I1 at its output. Signal −I1 is equal and opposite to SD assuming zero beam error. The signal input to APC 24-02 is thus error ΔE as has previously been described.

Actuation of switch 24-03 as above described is accomplished by VC1 24-93 in cooperation with time signal DR. When SD voltage level reaches +1, VC1 switches state producing the VC1 output pulse shown in FIG. 9a. Its positive edge is coincident with beam travel across the triad border and will shift in time, shown dotted, caused by a corresponding shift of the color separation voltage TR and/or HV. VC1 signal may also disappear if there is no beam crossing during a cycle, such as by production of a saturated color. Frequency divider 23-13 is triggered by the plus output of OR 24-94 as shown by output of +2 circuit 22-13 of FIG. 9a. This output shifts to the left to follow VC1 pulse. When VC1 disappears, the +2 circuit is triggered by the DR pulse input to OR as shown by the dashed line at 6. In this circuit, switching reversal always corresponds to scan across a triad border. Both the instantaneous value and the average value of the index signal per triad are equal to the simulated composite DCS signal SD. APC action thereby uses the color separation information to determine correct beam position rather than have it appear as a large error component which interferes on a constant indexing frequency.

Figures 9B, 9C:
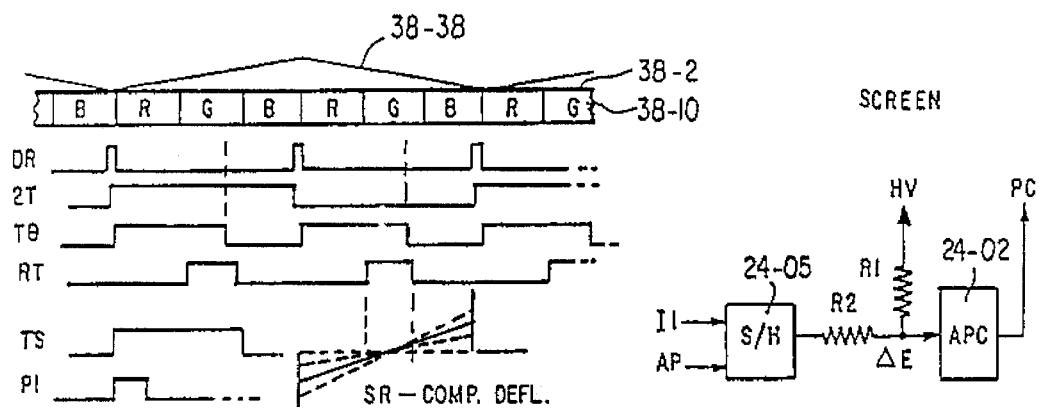
FIG. 9b is an alternative APC circuit method applicable to FIGS. 7, 8 and 9.
FIG. 9c shows APC waveform relationships.

FIG. 9b describes an alternate APC circuit section which may be used in connection with the embodiments of FIGS. 7, 8 or 9, and FIG. 9c shows pertinent control signal waveforms. In this circuit, the index signal is acquired by a sample and hold circuit S/H 24-05 which is activated by an acquisition pulse at input AP time to occur when the beam is at dominant hue position. Thus, an index output is provided which may be compared directly to hue signal HV via R2 and R1 to provide an APC output and as previously described.

FIG. 9c shows as reference elements a section of triad 38-10 and index pattern 38-38, triad zero reference pulse DR, hue phase pulse TΘ and +2 switching signal 2T corresponding to reversal of the index pattern. There is also shown pulse RT, described in FIGS. 2b and 2c, which herein is timed to bracket the DCS waveform SR, zero level of FIG. 8 and used to select the indexing signal when used for the APC circuit of FIG. 8. Pulse TS or a shortened pulse P1, derived from TS, is used to select the index signal interval when the circuit FIG. 9b is used to generate indexing for FIG. 9 APC. This index method depends upon the fact that the beam position (average value) should correspond to the dominant hue position selected by hue signal HV. Therefore, for pattern 38-38, the unitized and switched index signal I1 should be equal to HV during the selected pulse interval. This relation is shown by the composite deflection (using SR) with respect to the corresponding sample and hold pulse time RT (see FIG. 2c) as used in connection with FIG. 8.

The index circuits generating signal SD of FIGS. 8 and 9 are replaced by the circuit of FIG. 9b in which R1 connects to HV instead of to SD. Minus I1 is the signal input to sample and hold S/H amplifier 24-06. For FIG. 8b, the signal acquisition pulse AP input is RT and the output IH is the value of I1 during the acquisition time. It is held during the full cycle. Signal IH fed through R2 balances HV fed through R1 leaving ΔE error as the APCC input. For use in the circuit of FIG. 9, the S/H sampling pulse AP may be the saturation time signal TS since beam position is constant at HV during this interval, or AP may be the narrower constant width signal P1 whose timing is centered on hue. When FIG. 9b is used as FIG. 7 APC, the S/H circuit is not required because the index signal last for each full cycle. But, the hue HV input must be altered. In this case, a simulated voltage must be generated which accounts for both hue and saturation in a manner comparable to the development of other simulated voltages described herein.

Figures 9D, 9E:
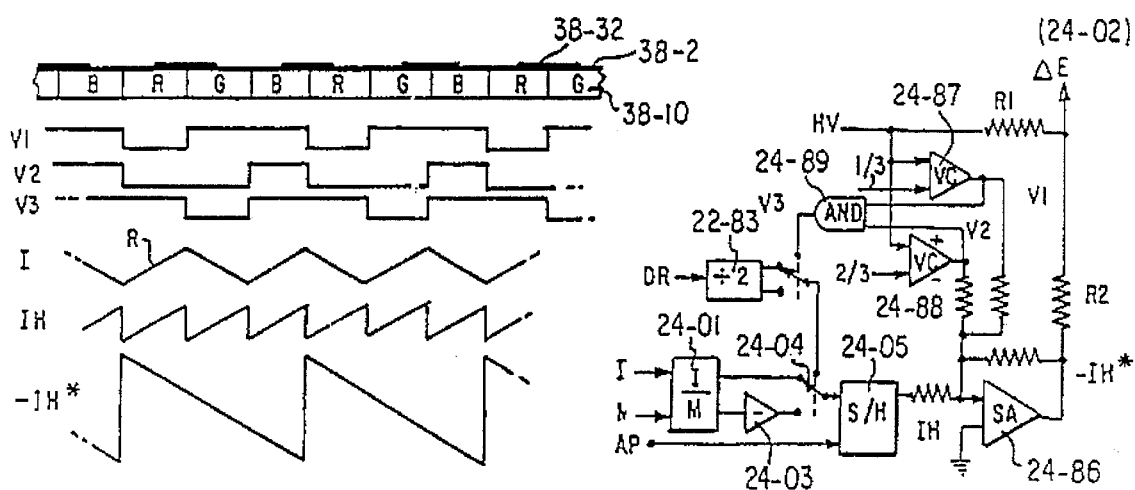
FIG. 9d is a second alternative APC circuit diagram described for application to FIGS. 8 and 9.
FIG. 9e waveforms show its operation.

The indexing circuit of FIG. 9d, applicable to the circuits of FIGS. 8 and 9 and having the pertinent waveforms of FIG. 9e use the same acquisition pulse as did the circuit of FIGS. 9b and 9c as an input for S/H circuit 24-05 and the same signal mixing from R1 and R2 into APC circuit 24-02 as did the circuit of FIGS. 9b and 9c, thereby comparing the index signal to hue. These figures provide an embodiment which may be used with conventional stripe patterns of which operation for pattern 38-32 (FIG. 2c) is described herein. Corresponding to index pattern 38-32, there is shown signal I as the beam is moved, corresponding to hue position across two triads. It has three signal reversals due to alternate triad as well as green index reversal. They will be switched dependent on position by S1 and S2. A composite index signal will be generated by the circuit comprising output summing amplifier 24-86 and two voltage comparators Vc1 24-87 and VC2 24-88. Hue signal HV is input to R1, VC1 and VC2. The positive outputs of VC1 and VC2 are summed into SA 24-86, each to cause a ⅓ triad beam shift upon transition of the state of its output. An input of VC1 is set at a voltage level to cause a + transition when a plus HV sift causes the beam to deflect past the R-G border as shown by waveform V1. An input of VC2 is set to cause transition of V2 at the G-B border. The output −IH of SA 24-86 feeds through R2 to provide index to balance hue at APC 24-02 input.

As has been previously described, index signal I is processed through divider 24-01, inverter 24-03, switch 24-04 and S/H circuit 24-05 and the output is the index input to SA 24-86. Output V1 of VC1 and inverted output V2 of VC2 are input to AND gate 24-89. Its output V3 is positive when hue HV corresponds to red or blue, but goes negative on green. Output V3 actuates S2 to feed the 2T output of +2 circuit 22-83 to S1 when positive and to feed inverted (bar) 2T when negative. Accordingly, I1 is not only reversed on alternate triads, it is reversed back if hue falls on green. The action in generating index signal −IH is shown in FIGS. 8C and 9C.

The conversion of signal I into signal IH and then into −IH* may be followed as the beam is moved across the two triads generating I as described above. In movement across the first (left) red stripe, the beam moves from fully off the first index stripe (I=0) to fully on (I=⅓) generating the first rising slope signal (R). As the beam moves from red to green, it moves off index 1 an I decreases. IH signal corresponds to I across red. At the border, the transition of VC1 switches S2, thereby S1, reversing IH slope and returning it to zero where cycle 1 is repeated in movement across green. At the R-G border, the transition V1 is added to I returning signal −IH* back to its −⅓ value which increases to −⅔ at the G-B border. Here the V2 transition causes a second switch reversal and another added ⅓ increment to repeat the process. At the B-R triad border, the +2 causes signal reversal and both VC1 and VC2 are reset to zero. The result is a triple transition at SA 24-86 output returning the signal to zero where the cycle is repeated for the second triad but with both switches being inverted. Signal $-IH^*$ will be noted to be the inverse of hue HV, thereby providing the error comparison voltage. The only difference in embodiments 8c and 9c is that the S/H enabling pulse for 8c is RT and for 9c is TS or T1. In actual operation, the beam does not move from cycle to cycle as has been presumed in order to show generation of the described curves. Hue may stay at relatively fixed values for indefinite numbers of cycles resulting in signal levels equal to the corresponding position on the curves.

There has been a growing demand over recent years for larger full color screen displays—a major area being consumer TV sets. The standard direct display CRT bulb becomes too bulky for such application and development has been channeled to projection systems. There has been no single bulb CRT having light output adequate for such application, so development has been directed to a variety of designs using separate R, G and B tubes, the outputs of which are aligned precisely to superimpose their color displays. These designs being directed to 3 tube requirements having not provided a preferred optical arrangement for a one tube design. Means have been described herein for obtaining a one to two order of magnitude increase in brightness for a single bulb CRT. These means have included optimum utilization (3 to 10 times) of pixel area which reduces both cathode and phosphor area loading. Beam time utilization increases output 5 times. Three beam versions provide another 6 times increase. A further substantial increase can be obtained over present state-of-art optical system, whereby lens speed is maximized while obtaining the same picture edge as center transmission. FIG. 10 shows the features of a preferred CRT projection system embodiment using the teachings of this application.

FIG. 10 shows an X-Z plane cross-sectional view of the front end (see FIG. 3) of a projection assembly 39-70 attached to the faceplate 37-7 and bulb 31-0 of a CRT preferably having gun 32-02 and operated in display system 20-70 as described in FIG. 7. However, the projection assembly is applicable to all of the system embodiments as described herein. The faceplate 37-7 is concave (opposite to normal curvature) and the screen pattern 38-0 is on its inside surface, the bulb being a break-away view only showing its point of attachment. The projection assembly 39-70 is a diagrammatic representation of the functioning of the basic elements used and is not intended to show design detail of the elements or variations thereof which may be used by one skilled in the art to achieve the objectives herein described.

The assembly elements are mounted in a housing 39-71 which is mounted to a CRT (not shown), making a seal to its faceplate. Optical lens element 39-73, sealed to the mount, provides a cavity through which a transparent cooling liquid 39-72 is circulated (flow arrows) and externally cooled by known means (not shown). Lens element 39-74 is held by mounting means 39-75 and lens element 39-76 is held by mount 39-77. The lenses may be compound elements and there may be intermediate elements to help perform corrections to be described.

Elements 39-74 and 39-76 cooperate to provide zoom focusing and picture size adjustment, both elements being axially translatable as shown by arrows at 3 and 4. This range typically need only be within 1.5 to 1. The lenses also at as a compound lens substantially reducing the assembly length from what a single lens would require and resulting in substantially larger light acceptance angles as shown at 1 and 2 than would otherwise be possible for a given lens size—hence increased lens speed and lower aperture number. This change is made possible by the curved CRT faceplate. Light emission from a luminous spot is most intense perpendicular to the surface. At the screen center, the normal ray 1c goes into the center of the lenses system and the major part of spot 1 emission can be collected by lens 39-74. For a flat screen the center of illumination, spot 2c, would be directed at the lens edge with large loss of intensity. The screen curvature is chosen so that the spot 2c emission is directed to enter near the lens 39-74 center and it collects the bulk of emission at position 2. Thus, there is provided a high speed lens system having uniform output to the full projected screen area. It is necessary to shape the elements, primarily 39-73, to conform so the curved CRT screen provides uniform optical focus over the full area of the projection screen and to provide an adequate degree of achromatic correction. In respect to the former it may be noted that the screen curvature is in the direction by which wide angle lenses typically need correction and, in respect to the latter, that correction of red and blue need not be better than one pixel.

It is desirable to provide a projection system with directly luminous pickup as has been described for FIG. 5a. This may be done using the wide angle peripheral light not picked up by the lens system. Two alternate methods use photodiodes 28-1a or 28-2a (only one each being shown) but it will be apparent that several of each color may be used as required to obtain uniform response from all areas of the phosphor screen. In the first method, the cooling liquid 39-72 is chosen to have a substantially higher index of refraction than the faceplate 37-70 or the lens 39-73. Wide angle luminous output of the beam is then trapped in the liquid which acts as a light pipe conveying this illumination to a convenient pickup point for photodiodes 28-1a. The light trap action also serves to prevent halo and other stray light reflections within the optical system thereby increasing display contrast ratio. In the alternate arrangement, the liquid index is held low to match optics and the stray light is picked up by an annular reflector or portions thereof and either directed into photodiode 28-2a directly or into a light pipe system for transmission to the photodiodes 2b.

One prior art method for generating a projection display uses what has been known as an Eidophor light valve projector using interference gratings in a Schlieren optical system. In this system, the light intensity transducer is the scanned electron beam of a typical TV raster. The electron charge repulsion on a deformable scanned surface due to beam intensity variations controls the degree of interference, hence the amount of light allowed through the system. The light source may be of very high intensity so Schlieren projectors may be used for very large bright displays. They have been used to provide large, bright, full color displays, including 1000 line high resolution versions by superimposing the picture components from the separate red, green and blue projectors. There is also a more complex interference system known as Talaria invented by William Glenn and requiring only one electron beam for color display. It has evolved into a high performance medium size but expensive display. There has never been an attempt or even suggestion to use SCS indexing with such systems. SCS has low efficiency but works in the manner of the embodiment to be described using a preferred DCS embodiment.

FIG. 11 is a projection system 110-0 providing a large, bright color display. It has a Schlieren projector 110-1, a projection lens 110-2 and a filter 110-3. The system will be described wherein the output optics of 110-1 are designed to project onto a conveniently close focal plane as shown. The filter 110-3, also shown in plan view in FIG. 11a, is located at this focal plane. The focal plane could as well be an equivalent image plane internal to the projector itself. It is shown separate for purposes of clarity in explanation. The filter is a pattern of R, G and B optical filtering stripes having the number of triads and size to fit the focal plane image size just as has been described for an equivalent phosphor pattern. The system 110-1 is different from the standard B/W projector of such prior systems in that the B/W beam control system is changed to one of the dynamic color separation systems 110-4 which have been described herein. The light valve system then projects the separated color control to its correct color stripe just as is done by having the beam excite the correct phosphor directly. The result is a much simplified full color display capable of high resolution and using a single light valve projector.

Figure 11B:
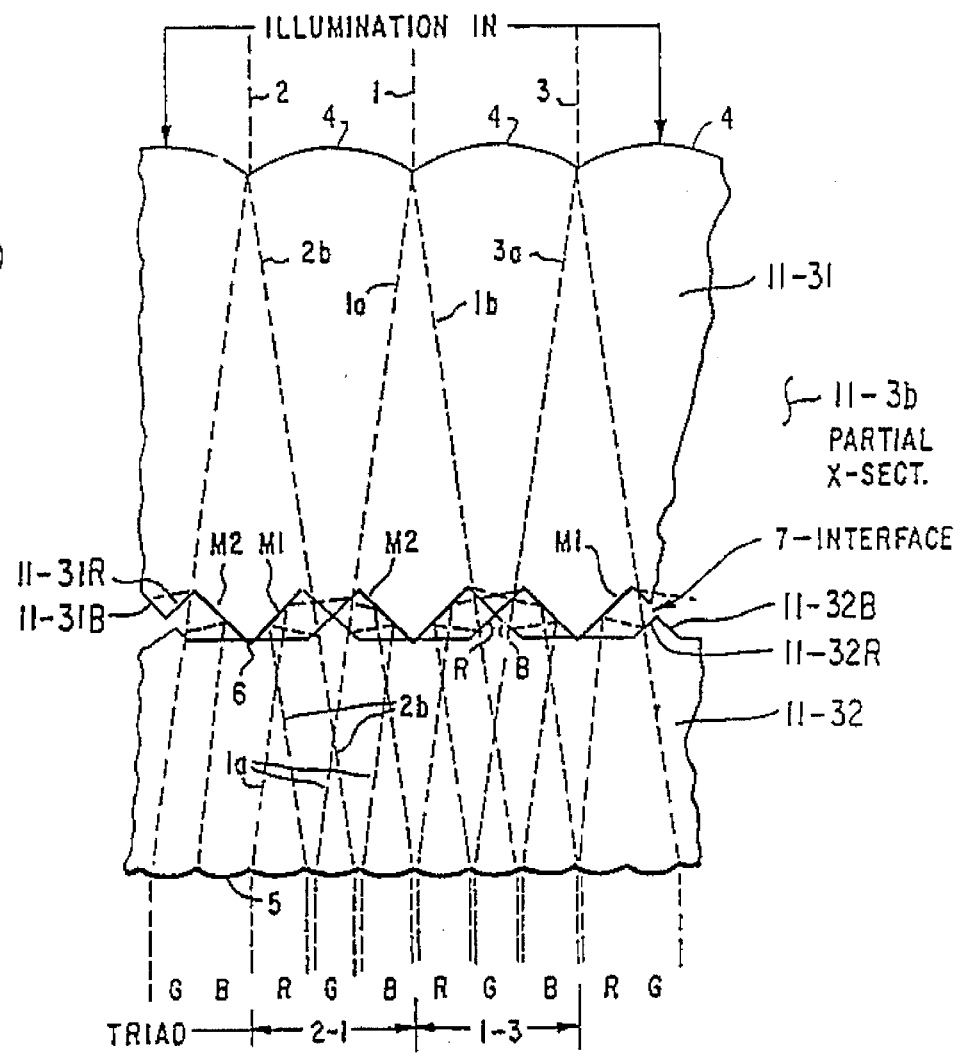

FIG. 11 illustrates color separation action using a light filter such as that shown in FIG. 11a. That filter comprises a pattern of stripes controlled to transmit the primary colors. FIG. 11 is essentially a Schlieren system and is capable of controlling a very strong source of illumination to provide a large, high brightness color display. The filter absorbs a large portion of the light energy and is, thus, inefficient. This inefficiency results in reduced output brightness and the filter is heated. Equivalent separation of the illumination course into primary color components, thereby to replace the filter, increases brightness and reduces heating. It is known to separate light from a source into three separate beams, each of which is a different primary color. In the present application, however, the source must be separated into a pattern of primary color beams having, preferably, many triads of stripes oriented with respect to a preferred display axis and imaged on the deformable light valve surface. Such a separation has been described in U.S. Pat. No. 3,595,990 for a camera application where the separated beams fall directly onto a target surface of the separator. In the present invention, the separated pattern must be projected, and FIG. 11b shows an improved color separation arrangement to accomplish this purpose.

FIG. 11b shows a partial cross section, taken perpendicular to the triad stripe direction, of the optical elements of a color separator having a pattern comparable to the filter of FIG. 11a. A source of uniform white illumination enters the separator 11-3b where it is focussed by an array of cylindrical lenses 4 into a pattern of stripes, each of which is split into three primary components which exit via cylindrical lens triplets 5. The separated output pattern is then imaged on the deformable surface of a light valve where dynamic or SCS color separation is performed in the same manner as has been described for FIG. 11 and equivalent direct view CRT displays.

FIG. 11b shows ray traces of the source illumination through the separator for a typical triad. The separator has two elements 11-31 and 11-32 which may be of equal index of refraction and an optical cement of similar index may be used to fill the small spaces between and seal them together. Small V-shaped grooves 6 in 11-32 align the elements precisely. The cylindrical lens elements 4 focus the illumination into narrow stripes at a color separator surface 7 at the interface between elements 11-31 and 11-32. The separated R, G and B beams then exist 11-32 through cylindrical lenses 5 which are designed to couple the output stripes into the follow-on optical projection lens.

The action may be understood by following peripheral rays 1, 2 and 3 through the system. Ray 1 is bent to the left to form ray 1a and to the right to form ray 1b. Similarly, ray 2 is bent to the right to form ray 2b and ray 3 is bent to the left to form ray 3a. Rays 1a–2b and 1b–3a converge (as example) onto beam separator surfaces at interface 7. These surfaces marked R and B form a cross which is comprised of surfaces 11-31 R and 11-31 B shown more clearly at the breakaway on the left and 11-32 R and 11-32 B on the right. The surfaces comprise well known dichroic mirrors in which surface R reflects red wavelengths and transmits all shorter wavelengths, and in which surface B reflects blue wavelengths and transmits all longer wavelengths. Ray 1a may now be traced through the system. At the 11-31 R surface its red component is reflected left where it strikes mirror surface M1 and is deflected downward emerging through a lens 5R as the red component of 1a. Ray 2b may be similarly traced, reflecting from 11-32 R and M1. Thus, the red spectrum of the illumination falling between rays 1 and 2 emerges to provide the red stripe of triad 21. The portion of 1a transmitted through the red dichroic strikes the blue dichroic. The blue spectrum is reflected to M2, thence downward. Similarly, ray 2b has its blue component reflected to M2 and downward, thus the blue illumination forming the blue stripe of triad 1-2. The green spectrum is transmitted through both the R an G dichroic surfaces and emerges as the green stripe of triad 12. Similar color separator action produces triad 1-3 of the section 11-3b as is typical of the full separator of FIG. 11b.

Figure 12B:
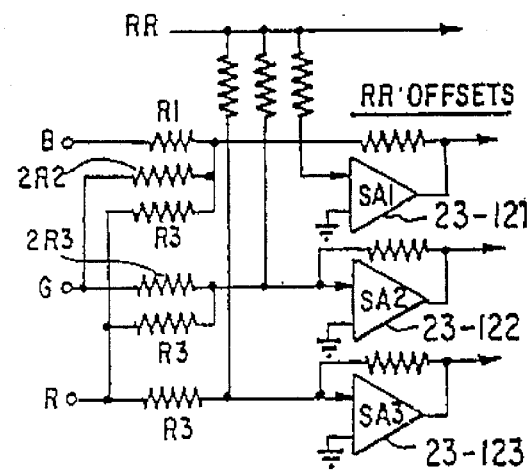
FIG. 12b shows an embodiment having alternate screen pattern.
Figure 12C:
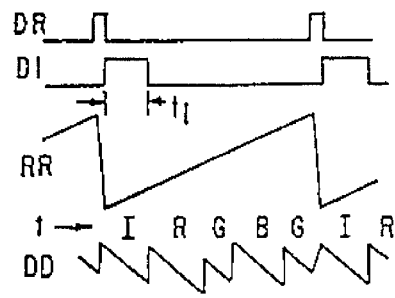
Figure 12:
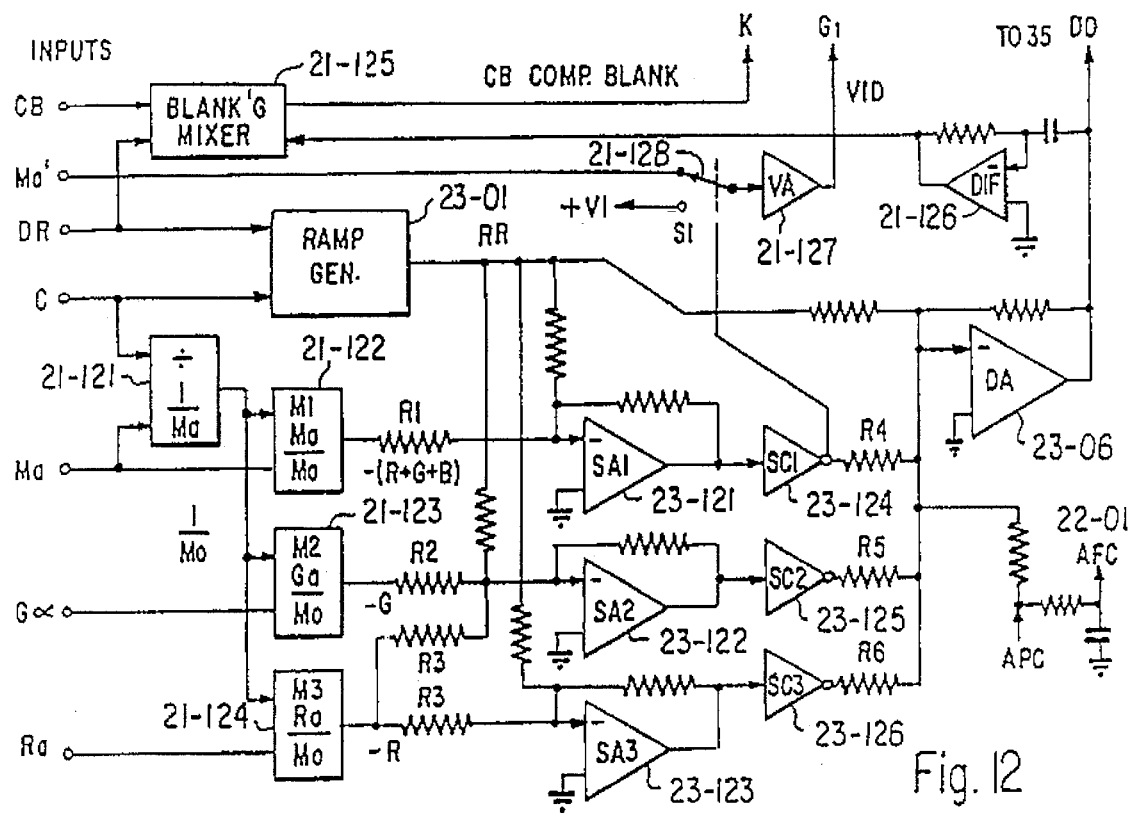
FIG. 12 is a circuit diagram showing a preferred embodiment of the combined DCS and indexing control functions.

The embodiment of FIGS. 12 through 12c employs a single beam tube with triads transverse to a beam scan line and having corresponding beam control features as previously described with respect to FIG. 3. It will use the time divider chain 22 of FIG. 1 and as shown in FIGS. 2b and 2c. However, because this DCS method is not subject to beam width errors and, unlike Zworykin, its arrest is operated at triad frequency, the master oscillator 22-02 of FIG. 2b may operate at triad transversal time T and feed TPG 22-12 directly. The system can work with other described indexing APC methods, in particular, that described for FIG. 4 in connection with FIG. 2b. An alternate preferred APC which readily combines with this DCS is used in FIG. 12 and provides the control signal to FC 22-01 to lock-in master oscillator 22-02.

The input control signals required for the FIG. 12 embodiments are ramp drive DR (22-12), 2T (for index reversal applications), Ac, C, Y and CR. See FIGS. 2d and 2e for these last signals. The actual index signal pickup, circuitry and behavior is as has been previously described to control not only the master oscillator, but A errors and line scan amplitude and centering.

Referring now to FIG. 12, the monochrome signal Ma' is input via $S_1$ (21-128) to video drive amplifier 21-127 whose output to the CRT G1 grid thereby modulates beam current to produce the brightness output of the display. In this circuit M (usually equal signal level) may be modified (Ma) to provide a different beam amplitude for each primary, thereby driving less efficient blue harder, for example, or even accommodating other more extreme signal conditions as will be more fully described below. Pulse DR provides time control of ramp generator 23-01 whose output RR couples through drive amplifier 23-06 having composite output DD which feeds beam deflection control means 35 to arrest the beam on successive stripes of the display format. As previously described, APC action maintains the beam in respect to each triad, and in this case, the action is to center the beam within each phosphor stripe. The beam is under substantially continuous arrest, it being abruptly shifted to successive stripes at time intervals corresponding to the required display color output and index intervals. It is the purpose of FIG. 12 to provide this time proportioning action which is derived from the S (or equivalent) and CR reference chrominance signals.

C and Y (or M) inputs to divider circuit 21-01 to generate an S signal have been described. What is required as input to activate the color separation, etc. circuits of FIG. 12 is a set of primary color signal components as unitized according to S. As noted above, the set need not be constant luminance Y or equal brightness M, but may be a set which we will designate Ma=Ra+Ga+Ba wherein the individual amplitudes may be varied to account for such factors as behavior efficiencies of the system. To show a full set of features, FIG. 12 starts with the input set being primaries, as above, whose generation and manipulation are well known. Ma input to divider 21-121 produces output $(1+\Delta c)$/Ma which provides one input to multipliers 21-122, 21-123 and 21-124. The other input to multiplier 21-124 is the red signal. The multiplier is configured to provide negative signal output. It is the ratio of red to total brightness modulated in amplitude by $\Delta c$. A green ratio is similarly generated by M2(21-123) and a total ratio at 21-122. This last ratio may seem redundant since the result is only a constant modulated by $\Delta c$. However, dynamic signal divider circuit suffer from distortions, limited frequency response and they reach an overload limit at low input signal levels. The circuit shown provides the same treatment to each output signal, thereby substantially cancelling or equalizing these discrepancies. This method is preferred also because the divider and multipliers do not have to respond to the 3.58 MHz chrominance signal, but only to the lower response color signals. Although there is no fundamental limitation, state of the art divider/multiplier IC's do not meet the chrominance response requirement and a circuit from basic parts becomes more elaborate than that described.

The color signals are each added to the ramp signal by summing resistors $R_1$, $R_2$ and $R_3$ connected as shown to respective summing amplifiers 23-121, 23-122 and 23-123. The amplifier outputs are input to respective voltage coincidence or equivalent circuits 23-124, 23-125 and 23-126. The VC's in this case are all shown as Schmitt triggers, but they could be other high speed logic gates having a transition reference level herein shown as zero voltage. The output transitions are summed into output driver 23-06 along with the APC signal and the arrest ramp RR. This completes the principal circuit function interconnections and their operation is illustrated by the waveform diagrams FIG. 12a.

Timing pulse DR initiates the reset cycle of ramp RR and establishes its cycle time corresponding to raster crossing of each triad. RR level is set at zero at time t=0. Addition of red ratio signal −R at the input of 23-123 causes its output to start from a positive level and follow RR output negative. This relationship is shown—as it would correspond for direct addition of the input signals—by the dashed curve R under RR of FIG. 12a. When the resultant signal reaches reference level (zero), 23-126 output makes a very high speed negative transition at time $t=t_R$ which is proportional to red signal amplitude. At the end of the ramp cycle the level returns to its starting position and 23-126 returns to its low level. Summing amplifier 23-122 has inputs RR, −R and −G. Its action is the same as described but t(R+G) always occurs after $t_R$ and the difference is $t_G$ as shown. The signal into 23-121 being unity=−(R+G+B) has the last transition time and the difference is $t_B$. The resultant of adding these transitions to ramp RR is shown by output waveform DD. Because both the color signals and the ramp are amplitude modulated by $\Delta c$, the action of $\Delta c$ does not change the transition times. But, as line scan sensitivity changes dependent on position on the format, $\Delta c$ adjusts DD slope to always cause correct beam arrest as shown by the composite waveform of W+DD. It may now be noted that summing resistors $R_1$, $R_2$ and $R_3$ may be selected to generate a desired Ma whether the input color signals were derived, for example, from Y (constant luminance), M (constant brightness) or other source and to match to arbitrary phosphor screen RGB characteristics desired. The beam is arrested on sequential color stripes; thus, for example, R at time t=0 for interval $t_R$. The red transition then jumps the beam to the G stripe during $t_G$/The R+G transition then shifts to blue during $t_B$ and the Ma transition shifts to the index stripe I during the remainder. It will next be noted that the stripe spacing may be of arbitrary width and the values of R4, R5 and R6 chosen so that the transition amplitudes match corresponding widths. Further, Ra, Ga and Ba may have different magnitudes such that, dependent on color output, the sum $t_R$, $T_G$ and $t_B$, need not be constant. In this case, $t_I$ varies to absorb the differential allowing flexibility in both beam I and chrominance T modulation. Next, it will be seen that at the I position the beam (30-0), if correctly positioned, is centered on the edge of index pattern 38-36. During this interval, ti, the output of trigger 23-124, is used to switch S1(21-128) to a constant reference level VI which provides a constant beam current during the index interval. If the beam is not centered as described, the index output signal will increase or decrease and this change provides the signal for APC action. The method may be changed to provide signal reversal as has been previously described using 2T, 4T, etc., but this system also works well in the single sided version as shown. The use of guard bands 38-4 allows for error in beam positioning without beam impingement on adjacent phosphors. Thus color purity is less critical and beam width changes which occur with beam current modulation do not affect chromaticity.

Figure 12A:
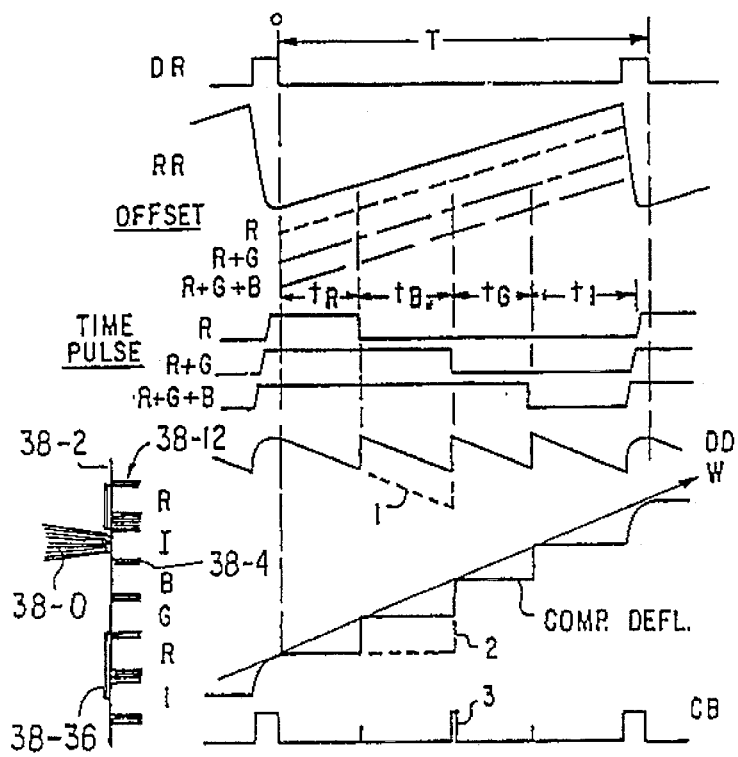
FIG. 12a is a diagram showing waveform relationships applicable to FIG. 12.

Color output is determined by time modulation shifts of $t_R$, $t_G$ and $t_B$. An example is shown in FIG. 12a at position 1 where R (dotted) increases causing $t_R$ to increase and $t_G$ to go to zero. Then red output is increased. Green is zero. Red and green transitions are simultaneous at position 2, so that the beam jumps from red over green to blue. When transitions are only one color, transition time is not critical. As for position 1, or in the case of producing a saturated primary color, when the transition would be across two stripes it is desirable that beam current be cut off or substantially reduced. This is accomplished by differentiator 21-126 which produces pulse 3. Pulse 3, DR, and composite or H and V blanking pulses are all fed into blanking mixer 21-125. It provides a signal to the CRT cathode which blanks the beam during all of these intervals.

It will be apparent from the above description that if the conditions and reasons stated for use of multiplier 21-120 were to be eliminated, then 21-122, 23-121, 23-124 and associated circuitry may be eliminated. Blue output is 1-R-G and $t_I$ would be generated as a fixed time pulse.

The use of the color sequence RGBGRGBG, etc. for a DCS example has been explained in FIG. 5. This type configuration also has advantage in high resolution applications such as HDTV and for such application as the projection sets of FIGS. 10 and 11. The basic system of FIG. 12 may be readily adapted and this is shown in FIG. 12b. The simplified version described above is presumed. The signals are as taken from the multiplier outputs and having the relative amplitude ratios as given. The circuit section shown is just the three summing amplifiers 23-121, 122, 123, since the rest of the circuitry is as has been described. The corresponding stripe sequence including index stripes is IRGBFIRGBGIR. etc. and the ramp cycle recurs at each index stripe. This is shown by the DR, RR and fixed indexing pulse DI timing waveforms FIG. 12c. A green stripe occurs twice per cycle. Accordingly, one half the G signal is allocated to each. This is accomplished by doubling the resistance of R2 in comparison to what its value would be in FIG. 12. The coupling network of R1, R2 and R3 resistors then provides the required RGBG offsets. I offset may be fixed by RR bias level. The double frequency of G which contains most luminous output provides higher apparent resolution since it is nearest while response. The color separation frequency, as exemplified by the arrest ramp, is substantially lowered from what would be required by FIG. 12 and stripe width can be increased by the reduction in their number.

It will be apparent to one skilled in the art that further pattern variations can be made similar to and for reasons as has been described in connection with the prior figures of this application. Other modifications within the scope of the appended claims will be apparent to those of skill in the art.

I claim:

1. A CRT having a phosphor screen, said phosphor screen having a pattern of triads of primary color stripes and an electron beam forming structure for generating an electron beam and impingement control of said; in relation to the color stripes of a said triad at each pixel of said screen for at least one electron beam group comprising:

an electron emissive cathode, a multi-aperture G1 grid structure wherein the G1 grid for each said beam group has a plurality of apertures for generating a plurality of electron beams for forming an electron beam group, in which grid structure said apertures are sized and spaced such that a plurality of energy distributions of said electron beams overlap and combine to provide a shape and size, of an impingement pattern of the beam group, said impingement pattern shape and size being means for precisely matching a shape and size of a primary color stripe at said pixel, when the beam group is focused on said output screen surface, a G2 electrode structure having an aperture pattern corresponding to said multi-aperture G1 grid structure and arranged to provide an electric field to provide a beam accelerating voltage to said electron beam group, means for focusing the electron beam group, and an output anode electrode of an electron gun portion of said beam forming structure for accelerating said electron beam.

2. A CRT electron beam forming structure according to claim 1 wherein said cathode has at least one grooved surface matching an outline of said G1 grid having a plurality of apertures, said grooved surface selected to provide substantially uniform cathode emission over the grooved area.

3. A CRT electron beam forming structure according to claim 1 wherein the electron emission area of said cathode is confined to limit peripheral electron emission through each said plurality of apertures.

4. A CRT electron beam forming structure according to claim 1 wherein said electron beam focusing means comprises an electronic lens electrode acting in conjunction with said output anode electrode to form an electrostatic beam focusing field, magnetic means for forming an axial magnetic focus field, said electron beam focusing means and said magnetic means being operative to provide beam focus at said screen.

5. A CRT electron beam forming structure according to claim 4 wherein said magnetic means includes at least one permanent magnet.

6. A CRT electron beam forming structure according to claim 5 wherein a permanent magnet comprises a thin annular ring structure sandwiched between front and rear sections of a magnetic core of a beam deflecting yoke.

7. A CRT electron beam forming structure according to claim 1 wherein said electron beam forming structure includes:

a central axis of the electron beam group;

a third electrode structure following said G2 electrode structure and symmetrically placed about the central axis of said electron beam group for operating at potentials to control displacement and divergence of said beam impingement across said triad of primary color stripes.

8. A CRT electron beam forming structure according to claim 7 wherein said electron beam forming structure generates three electron beam groups matching said three primary color stripes, wherein said third electrode structure has four electrodes positioned one each side of each beam group and wherein differential potentials between said inside and said outside electrodes causes convergence of said outside beam.

9. A CRT electron beam forming structure according to claim 7 wherein said electron beam forming structure generates a single electron beam or multi-aperture beam group, wherein said third electrode structure comprises an electrode each side of said single beam or beam group operative at or near cathode potential, wherein a differential voltage causes minor beam deflection and a common mode voltage aids beam width control.

* * * * *